United States Patent
Cohen et al.

(10) Patent No.: US 10,412,212 B2
(45) Date of Patent: *Sep. 10, 2019

(54) SYSTEM AND METHODS TO FACILITATE SAFE DRIVING

(71) Applicant: SAVERONE 2014 LTD., Petah-Tikva (IL)

(72) Inventors: Yossef Cohen, Hod Hasharon (IL); Amiram Gur Gerasi, Ganey Tikva (IL); Eliyahu Gur, Hannaton (IL); Yaakov Shoshan, Ashkelon (IL)

(73) Assignee: SAVERONE 2014 LTD., Petah-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,318

(22) Filed: Aug. 2, 2018

(65) Prior Publication Data
US 2019/0037067 A1  Jan. 31, 2019

Related U.S. Application Data

(63) Continuation of application No. 15/314,295, filed as application No. PCT/IL2015/050630 on Jun. 22, 2015, now Pat. No. 10,075,581.

(Continued)

(51) Int. Cl.
*H04B 1/38* (2015.01)
*H04M 1/725* (2006.01)
(Continued)

(52) U.S. Cl.
CPC ........ *H04M 1/72569* (2013.01); *H04L 67/34* (2013.01); *H04M 1/6075* (2013.01);
(Continued)

(58) Field of Classification Search
CPC ........ H04W 4/027; H04W 4/48; H04W 4/50; H04W 4/02; H04W 4/046; H04W 4/80;
(Continued)

(56) References Cited

U.S. PATENT DOCUMENTS 7,898,428 B2   3/2011   Dietz et al.
8,131,205 B2   3/2012   Rosen
(Continued)

FOREIGN PATENT DOCUMENTS

CN   101415039 A   4/2009
CN   102177750 A   9/2011
(Continued)

OTHER PUBLICATIONS

Kobayashi, T. (Aug. 2006). Measurements and Characterization of Ultra Wideband Propagation Channels in a Passenger-Car Compartment. In Spread Spectrum Techniques and Applications, 2006 IEEE Ninth International Symposium on (pp. 228-232). IEEE.

*Primary Examiner* — Ajibola A Akinyemi
(74) *Attorney, Agent, or Firm* — Browdy and Neimark, P.L.L.C.

(57) ABSTRACT

A vehicle safety system operating on a driver's cellphone and comprising selective blocking apparatus, controlled by a processor, for blocking specified functionalities of the cellphone only when the cellphone is in a moving vehicle; and communication functionality operative to receive from a remote server and feed to said processor, updates which determine which specified functionalities to block.

22 Claims, 11 Drawing Sheets

Related U.S. Application Data

(60) Provisional application No. 62/112,484, filed on Feb. 5, 2015, provisional application No. 62/015,445, filed on Jun. 22, 2014.

(51) Int. Cl.
| | | |
|---|---|---|
| *H04M 1/60* | (2006.01) | |
| *H04W 4/50* | (2018.01) | |
| *H04L 29/08* | (2006.01) | |
| *H04W 4/02* | (2018.01) | |
| *H04W 4/48* | (2018.01) | |

(52) U.S. Cl.
CPC ....... *H04M 1/72577* (2013.01); *H04W 4/027* (2013.01); *H04W 4/48* (2018.02); *H04W 4/50* (2018.02)

(58) Field of Classification Search
CPC ........... H04M 1/6075; H04M 1/72569; H04M 1/72577
USPC .......................................................... 455/457
See application file for complete search history.

(56) References Cited

U.S. PATENT DOCUMENTS

| | | | |
|---|---|---|---|
| 8,204,649 B2 | 6/2012 | Zhou et al. | |
| 8,526,973 B2 | 9/2013 | Thomson | |
| 8,527,013 B2* | 9/2013 | Guba | G08G 1/20 |
| | | | 455/41.2 |
| 8,532,676 B1* | 9/2013 | El-Sallabi | H04W 64/00 |
| | | | 455/456.5 |
| 2007/0072553 A1 | 3/2007 | Barbera | |
| 2007/0140187 A1 | 6/2007 | Rokusek et al. | |
| 2008/0064446 A1 | 3/2008 | Camp et al. | |
| 2009/0146881 A1* | 6/2009 | Mesecher | G01S 5/0009 |
| | | | 342/378 |
| 2009/0298482 A1 | 12/2009 | Yen et al. | |
| 2010/0033312 A1 | 2/2010 | Chauncey et al. | |
| 2010/0087137 A1 | 4/2010 | Fischer et al. | |
| 2010/0279626 A1 | 11/2010 | Bradley et al. | |
| 2011/0021234 A1 | 1/2011 | Tibbitts et al. | |
| 2011/0039581 A1 | 2/2011 | Cai et al. | |
| 2011/0077032 A1 | 3/2011 | Correale et al. | |
| 2011/0105082 A1* | 5/2011 | Haley | H04M 1/72577 |
| | | | 455/411 |
| 2011/0143719 A1 | 6/2011 | Jung et al. | |
| 2012/0056785 A1* | 3/2012 | Jovicic | G01S 5/0236 |
| | | | 342/450 |
| 2012/0196544 A1 | 8/2012 | Bolingbroke | |
| 2012/0309296 A1 | 12/2012 | Tieman et al. | |
| 2013/0035117 A1 | 2/2013 | Litkouhi et al. | |
| 2013/0045698 A1 | 2/2013 | Dale | |
| 2014/0024358 A1 | 1/2014 | Racha et al. | |
| 2014/0335902 A1* | 11/2014 | Guba | H04W 4/027 |
| | | | 455/456.4 |

FOREIGN PATENT DOCUMENTS

| | | |
|---|---|---|
| CN | 102215467 A | 10/2011 |
| WO | 2010/042545 A1 | 4/2010 |

\* cited by examiner

| App Parameter/Characteristic | US | Europe | APAC | Australia | South America |
|---|---|---|---|---|---|
| A – TWD (SMS) | X | | X | | X |
| B – IM (WhatsApp) | X | X | X | X | |
| C – Web Surfing (Google) | | X | | X | X |
| D – Games | X | | X | | X |
| E | | X | | X | |
| RED Geographical Areas | X | X | | X | X |

Fig. 4a

| App Parameter/Characteristic | Fleet-A | Fleet-B | Fleet-C | Fleet-D | Fleet-E |
|---|---|---|---|---|---|
| A – TWD (SMS) | X | | X | | X |
| B – IM (WhatsApp) | X | X | X | X | |
| C – Web Surfing (Google) | | X | | X | X |
| D – Games | | X | | X | X |
| RED Geographical Areas | X | | X | | X |

Fig. 4b

| Area Characteristic | US | Europe | APAC | Australia | South America |
|---|---|---|---|---|---|
| Single lane + > 60 MPH | X | | X | | X |
| Known RED intersection* | X | X | X | X | |
| Known RED Roads* | | X | | X | X |
| Characteristic X | X | | X | | X |

Fig. 4c

SYSTEM AND METHODS TO FACILITATE SAFE DRIVING

REFERENCE TO CO-PENDING APPLICATIONS

Priority is claimed from U.S. provisional application No. 62/015,445 filed 22 Jun. 2014 and entitled "System for preventing texting while driving" and U.S. Ser. No. 62/112,484, filed 5 Feb. 2015 with the same title.

FIELD OF THIS DISCLOSURE

The present invention relates generally to systems promoting safe driving and more particularly to preventing danger due to use of electronic devices by the driver.

BACKGROUND FOR THIS DISCLOSURE

Driver distraction due to use of Smartphones contributes to up to 25% of car accidents worldwide. Tens of thousands of traffic accidents occur each year in the U.S. due to texting, browsing and use of other distracting cellphone functions while driving, causing thousands of deaths and tens of thousands of injuries each year.

Cellphone use is a prime cause of youngsters' deaths in car accidents in the U.S., and has exceeded statistics for deaths due to consumption of alcohol.

Texting While Driving (TWD) increases the risk of a car accident by at least twenty-fold. U.S. traffic accidents cause billions of dollars of damage annually and a quarter of these accidents are associated with cellphone use. Current attempted solutions include applications that are voluntary, hence are not used, e.g. due to the subjective feeling that "Nothing will ever happen to me" and HW/SW solutions that either require driver's consent, can be removed by the driver, or block all cellphone use (including voice calls). There is no effective solution that is widely adopted to date.

Conventional technology constituting background to certain embodiments of the present invention is described in the following publications inter alia:

Patent document U.S. Pat. No. 8,131,205 discloses mobile phone detection and is operative to transmit different blocking signals capable of degrading or blocking mobile phone communication in a vehicle responsive to a velocity of the vehicle reaching different pre-configured velocity levels.

Patent document U.S. Pat. No. 8,526,973 discloses a safety system that prevents the use of smart phone functions and replaces the blocked functions with alternative ways to communicate while in a car. The system allows software applications to be downloaded and run on its operating system. The system uses a local RF transmitter mounted in the car to send a signal detected by Smartphones in the car. The Smartphones download the application, decode the RF signal and disable and/or activate certain functions of the Smartphone.

Patent document U.S. Pat. No. 8,204,649 discloses systems for preventing mobile computing device use while driving. A vehicle state is identified based on information received from an OBD port in the vehicle e.g. disabling mobile computing device email, texting, gaming, received phone calls, web browsing, and transmitted phone call functions.

Patent document US20100087137 discloses a vehicle safety system which selectively deactivates a driver's cellular telephone when the driver is ready to drive his or her vehicle. The vehicle safety system first determines the proximity between the cellular telephone and the driver's seat of the vehicle by sensor to determine when the cellular telephone is located within a pre-set range from the driver's seat of the vehicle and the gear state indicates the vehicle may be driven under power.

Patent documents U.S. Pat. No. 7,898,428 and US110039581 describe restricting the use of a mobile device while driving.

The disclosures of all publications and patent documents mentioned in the specification, and of the publications and patent documents cited therein directly or indirectly, are hereby incorporated by reference. Materiality of such publications and patent documents to patentability is not conceded

SUMMARY OF CERTAIN EMBODIMENTS

Certain embodiments of the present invention seek to provide programmable blocking of cellphone functionality which enables use of only "white list" applications, e.g. as defined by local policy (that varies from region to region and/or per employer/insurer-associated fleet e.g. via application server that updates a mobile app periodically. It is appreciated that the term "fleet" is used herein to refer to any group of vehicles which may all be owned by a single corporation or may all be leased by a single corporation or may all be insured by a single insurer. It is appreciated that "private drivers" may subscribe to the computerized service described herein independently and not via any corporation or insurer. Each corporation, insurer or private driver may have its or her or his own white-list data repository, according to certain embodiments of the invention.

Certain embodiments of the present invention seek to provide a Self Enforcing System for blocking of cellphone functionality while driving, including a system control unit for blocking of cellphone functionality, which guarantees driver compliance in using only system-approved cellphone applications when driving, e.g. whether his/her cellphone is connected to a system control unit, or not e.g. by virtue of cooperation between a mobile application and an alarm system which sounds an alarm if the driver disconnects the Bluetooth or other communication, or removes the mobile app. Typically, the alarm is designed to be disturbing enough to the driver (and passengers), similar to the seat-belt off alarm, so as to ensure the following sequence: driver inactivates vehicle's system e.g. Bluetooth off or system's mobile app deleted—on-board system components enter alarm mode and an annoying alarm is generated—driver reconnects system—system returns to safe mode in which dangerous cellphone functionalities e.g. those requiring texting are deactivated—and texting accidents are thus averted.

According to certain embodiments, all text-operated apps are blocked other than, possibly, text-operated apps which are individually whitelisted e.g. Waze.

Certain embodiments of the present invention seek to provide using an alarm for ensuring driver compliance with blocking of cellphone functionality while driving e.g. whenever the system identifies that the driver has a phone and is driving, but the phone is not connected to the system for blocking of cellphone functionality e.g. BT (Bluetooth or other communication) is turned off or cellphone functionality blocking mobile app is not activated.

A particular advantage of providing the above in suitable combination is that fleet discipline (fleet policy re which cellphone functionality may be used by drivers e.g.) may thereby be effectively enforced for all vehicles in the fleet.

Certain embodiments of the present invention seek to provide a system for identifying the presence of a driver's cellphone including distinguishing same from presence of other cellphones in the same vehicle, e.g. cellphones held by passengers next to or behind the driver.

Certain embodiments of the present invention seek to provide a system for preventing driver distraction due to phone usage which may include a mobile application and/or a radio transmitter. A system control unit typically runs real-time decision making hardware and/or software methods receiving real-time data from a driver's mobile and/or vehicle via a wireless or wired connection. The mobile application may be operative for controlling a driver's phone functions and/or sending driver data to a server and allowing only selected mobile features while driving. The radio transmitter circuit may output RF signals to an interface with mobile communications and may block the signals. The system control unit and/or Radio Transmitter may be permanently installed inside the vehicle. Modes of operation may include some or all of: (i) Idle—operating but inactive since vehicle is not moving, enables full phone functions. (ii) Active—vehicle driving, mobile application is active in blocking apps e.g. present a "black-list" of applications and services on the driver's phone. (iii) Alert (or Blocking) mode—if system control unit cannot communicate with the mobile application and/or radio transmitter circuit—perform an undesirable action from the driver's point of view e.g. block all phone communications or generate an alert such as an unpleasant driver-audible sound.

Using, for example, an In Vehicle Protection System (e.g. InVPS™) certain embodiments shown and described herein prevent in-vehicle cellular use for activities that are prohibited by local laws (e.g. Texting While Driving (TWD)). Hardware and software elements may be permanently installed in the vehicle.

At least the following embodiments are included in the scope of the present invention:

Embodiment 1

A vehicle safety system operating on a driver's cellphone and comprising:

Selective blocking apparatus, controlled by a processor, for blocking specified functionalities of the cellphone only when the cellphone is in a vehicle in motion; and communication functionality operative to receive from a remote server and deliver updates which determine which specified functionalities the selective blocking apparatus is to block.

Embodiment 2

A system according to Embodiment 1 wherein said specified functionalities comprise apps.

Embodiment 3

A system according to any of the preceding embodiments wherein only specified functionalities deemed dangerous, according to programmable cellphone functionality safety criteria, are blocked by said Selective blocking apparatus.

Embodiment 4

A system according to any of the preceding embodiments and also comprising a mobile app; and at least one remote server having a dynamic repository of cellphone functionality safety data which sends downloads to the mobile app via said communication functionality, for each of a multiplicity of vehicles.

Embodiment 5

A system according to any of the preceding embodiments wherein said dynamic repository comprises:

at least one cellphone functionality safety-ranking list; and corresponding functionality, in the server and in the mobile app, operative to update said at least one cellphone functionality safety-ranking list.

Embodiment 6

A system according to any of the preceding embodiments wherein said dynamic repository comprises a plurality of "white lists" of apps corresponding respectively to a plurality of fleets of vehicles and wherein the communication functionality in an individual vehicle downloads an individual white list of apps from among said plurality thereof, depending on the individual fleet from among said plurality thereof, to which the individual vehicle belongs.

Embodiment 7

A system according to any of the preceding embodiments wherein the processor controls said Selective blocking apparatus to block certain functionalities of the cellphone only when the vehicle is in a first type of geographic location and not when the vehicle is in a second type of geographic location.

Embodiment 8

A system according to any of the preceding embodiments wherein the first type of geographic location comprises a high-risk road or portion thereof.

Embodiment 9

A system according to any of the preceding embodiments wherein the communication functionality resides in a mobile application on the driver's cellphone, which is updated on occasion by a remote application server.

Embodiment 10

A system according to any of the preceding embodiments wherein the communication functionality comprises a radio transmitter.

Embodiment 11

A system according to any of the preceding embodiments wherein the processor receives real-time data from at least one of the driver's cellphone and the vehicle via at least one of a wireless connection and a wired connection.

Embodiment 12

A system according to any of the preceding embodiments wherein the mobile application is operative for sending driver data to a server.

Embodiment 13

A system according to any of the preceding embodiments wherein the radio transmitter circuit is operative to output RF signals to interface with mobile communications.

Embodiment 14

A system according to any of the preceding embodiments wherein Driver identification apparatus is installed in the vehicle and remains there irrespective of whether the driver and/or his cellphone is or is not in the vehicle.

Embodiment 15

A system according to any of the preceding embodiments wherein the Selective blocking apparatus has at least one of (or all of or any pair of or any 3 of) the following modes of operations:
(i) Idle mode—Selective blocking apparatus is inactive since vehicle is parked, enables full functionality of the driver's cellphone
(ii) active/safe mode—selective blocking apparatus is controlled by the processor to be active in blocking cellphone functionality while vehicle is driving; and
(iii) undesirable/alert mode—Selective blocking apparatus is unable to operate (e.g. because main unit can't communicate with the mobile application and/or radio transmitter circuit or driver disconnects Bluetooth or removes mobile app) so the processor cause an undesirable outcome from the driver's point of view to occur; and
(iv.) safe mode in which the system is disabled.

Embodiment 16

A system according to any of the preceding embodiments wherein said undesirable outcome comprises at least one of:
all phone communications from the driver's cellphone are blocked;
activation of an alert e.g. alarm audible to the driver.

Embodiment 17

A system according to any of the preceding embodiments and also comprising an alarm controlled by the processor to operate if and only if the Selective blocking apparatus is in undesirable mode.

Embodiment 18

A system according to any of the preceding embodiments wherein the processor comprises cellphone identification functionality which enables the processor to control the Selective blocking apparatus for blocking specified functionalities of only the driver's cellphone without affecting functioning of other cellphones present in a moving vehicle.

Embodiment 19

A system according to any of the preceding embodiments wherein said cellphone identification functionality utilizes at least Time-Differential-Of-Arrival (TDOA) technology to distinguish the driver's cellphone from other cellphones present in a vehicle whose engine is on.

Embodiment 20

A system according to any of the preceding embodiments wherein said cellphone identification functionality utilizes at least Channel Fingerprinting technology to distinguish the driver's cellphone from other cellphones present in a vehicle whose engine is on.

Embodiment 21

A system according to any of the preceding embodiments wherein said cellphone identification functionality utilizes at least one of the following technologies to distinguish the driver's cellphone from other cellphones present in a moving vehicle: Angle-Of-Arrival (AOA)/Direction-Of-Arrival (DOA) technology; Time-Of-Arrival (TOA) technology.

Embodiment 22

A system according to any of the preceding embodiments wherein said Channel Fingerprinting technology utilized by said cellphone identification functionality comprises Power Level based technology.

Embodiment 23

A system according to any of the preceding embodiments wherein said Channel Fingerprinting technology utilized by said cellphone identification functionality comprises Delay-spread based technology.

Embodiment 24

A system according to any of the preceding embodiments wherein the Selective blocking apparatus is controlled by the processor for blocking at least one manually operated functionality of the cellphone and wherein at least one voice-operated functionality of the cellphone is not blocked.

Embodiment 25

A system according to any of the preceding embodiments wherein the Selective blocking apparatus is controlled by the processor for blocking at least some text-operated apps of the cellphone.

Embodiment 26

A system according to any of the preceding embodiments and also comprising at least one "white list" database.

Embodiment 27

A computer program product, comprising a non-transitory tangible computer readable medium having computer readable program code embodied therein, said computer readable program code adapted to be executed to implement a vehicle safety method operating on a driver's cellphone and comprising:
Controlling a processor for selectively blocking specified functionalities of the cellphone only when the cellphone is in a vehicle in motion; and
Controlling communication functionality operative to receive from a remote server and deliver updates which determine which specified functionalities the selective blocking apparatus is to block.

Embodiment 28

A vehicle safety method operating on a driver's cellphone and comprising:

Using a processor for selectively blocking specified functionalities of the cellphone only when the cellphone is in a vehicle in motion; and Using communication functionality operative to receive from a remote server and deliver updates which determine which specified functionalities the selective blocking apparatus is to block.

The term "mobile (communication) device" and similar, as used herein is intended to include but not be limited to any of the following: mobile telephone, smart phone, playstation, iPad, TV, remote desktop computer, game console, tablet, mobile e.g. laptop or other computer terminal, embedded remote unit.

Any tables herein may include some or all of the fields and/or records shown herein.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein e.g. by providing one or more modules in the processor/s to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 4a-4c are tables useful in understanding certain embodiments of the present invention.

Figure 1:
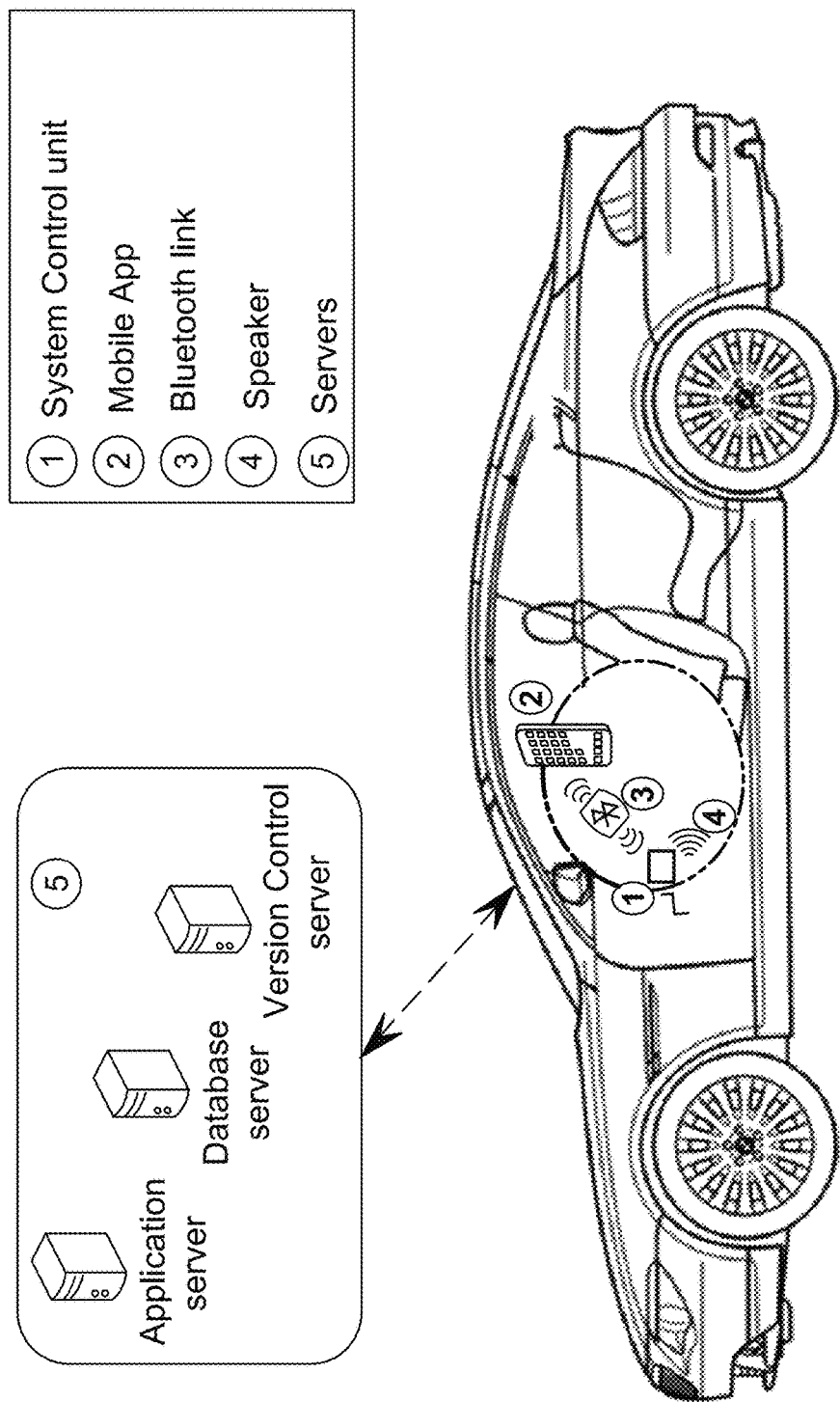
FIGS. 1 and 3 and prior art

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

An effective solution is needed to combat the worldwide epidemic of dangerous cellphone functionalities e.g. texting while driving.

Certain embodiments of the system shown and described herein typically uses a self enforcing mechanism to ensure that the driver's cellphone connects to the system; otherwise the system may activate various means to prevent use of prohibited applications.

Upon automatic connection to the system, the driver may be unable to use dangerous/non-permitted applications (texting, browsing, etc.), whereas passengers may not be limited in cellphone use.

Figure 2:
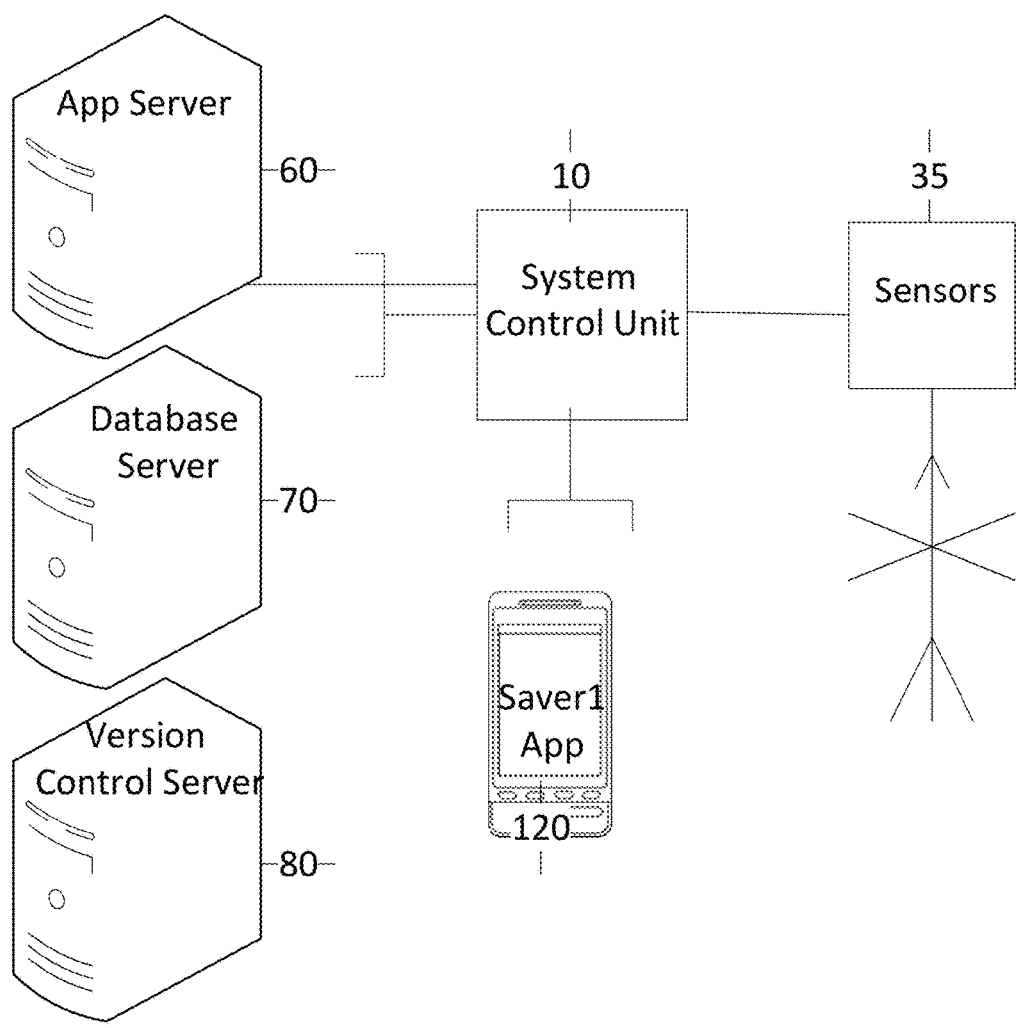
FIGS. 2 and 12 are simplified functional block diagrams illustrating certain embodiments of the present invention.
Figure 12:
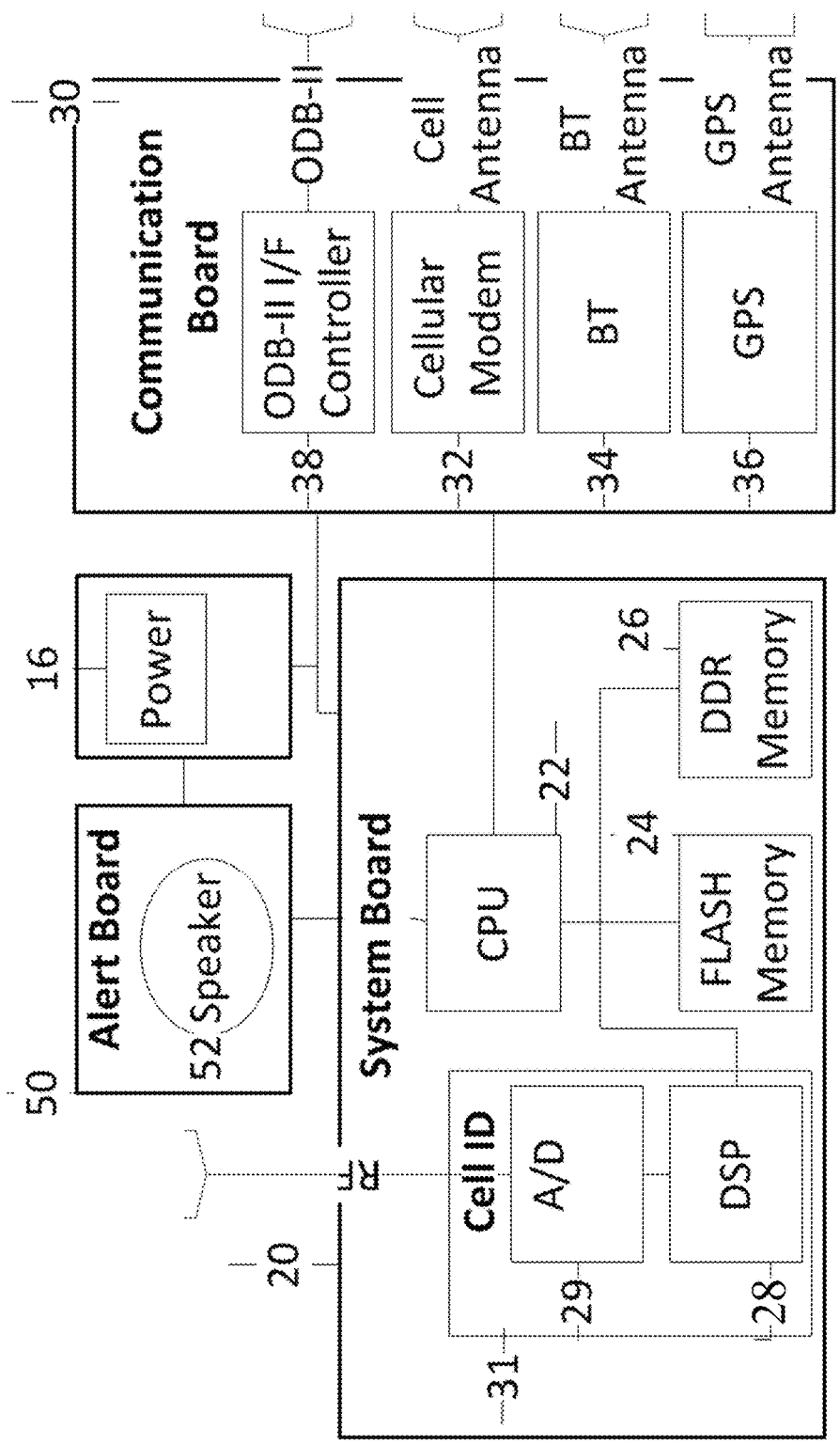

The system shown and described herein may include some or all of the components shown and described in FIGS. 1, 2, 12; these components are described herein.

System control unit 10 (also termed herein the "Main unit") is an in-vehicle installed device, responsible for managing and controlling some or all of the driving safety protection provisions described herein. The system control unit 10 typically executes and runs real-time decision making processes, implemented in hardware and/or software, e.g. based on real-time data from the driver's cell phone and/or from the system control unit's own internal GPS.

The system control unit 10 typically incorporates interfaces and/or encoded protocols to communicate, through wireless or wired connections, with system components including some or all of:

1. Mobile application 120
2. Cellphone Identification module of FIG. 8 (i.e. Cell ID 31 in FIG. 12)
3. Communication module 30
4. Alert System 50
5. Power module 16

The box is typically installed permanently in the vehicle i.e. is not intended to be removed by the driver when s/he parks the car. The box may be connected to the vehicle's ODB and sensors employed according to certain embodiments as described herein in any convenient matter e.g. via a wired connection (e.g. single wire using an SMA connector) and typically communicates wirelessly e.g. via Bluetooth with the mobile App 120.

Figure 6:
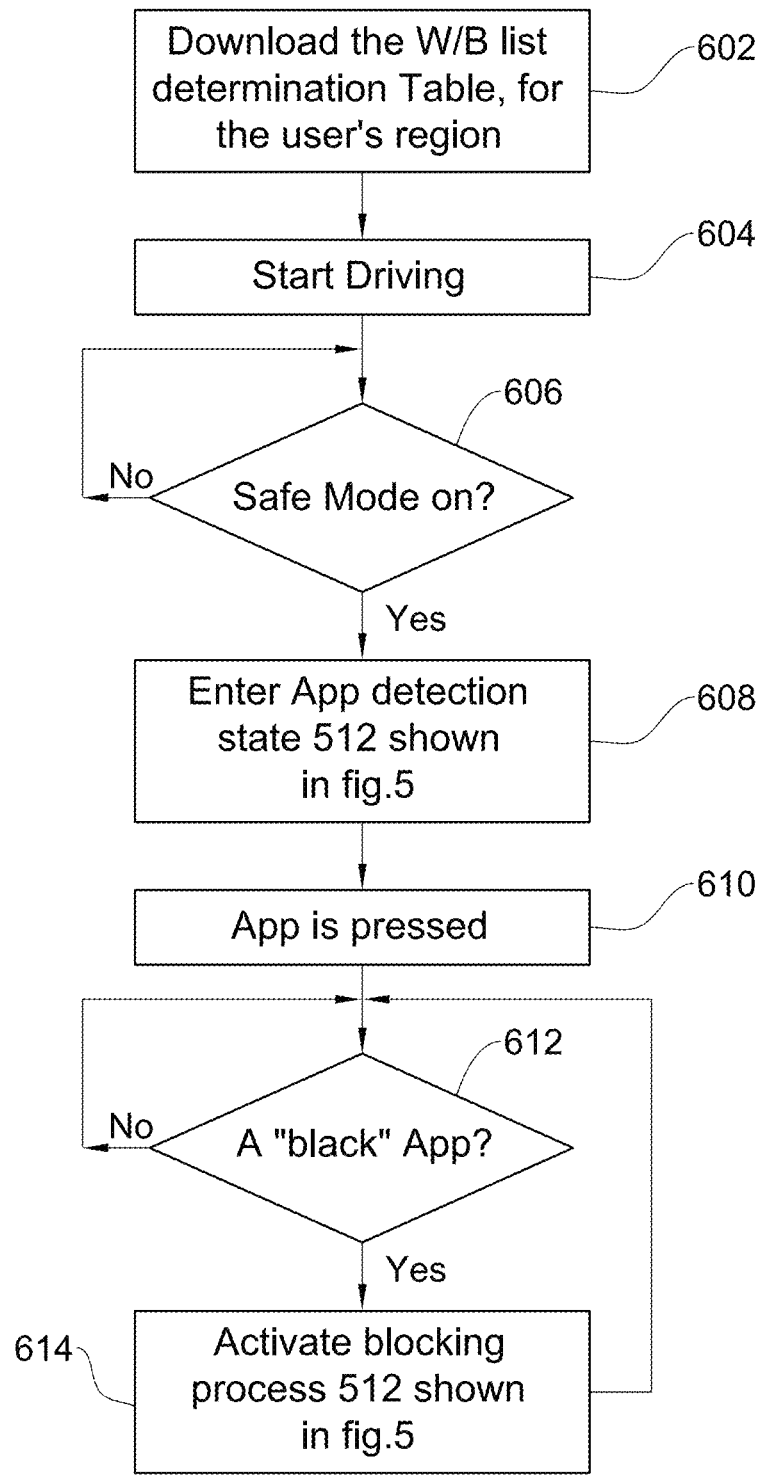

The system's operation and decision-making process (e.g. as represented by a suitable state machine such as that shown and described herein by way of example) is typically based on an interaction between the vehicle's driving state (identified e.g. by the GPS and APIs from the mobile or the vehicle's ODB, e.g. ODB-II) and the driver's mobile phone state. The system typically continuously monitors one or both, to determine actions to be taken, e.g. as shown in FIG. 6.

A mobile application 120 may be employed to control the driver's phone functionality, when operated while driving in a vehicle installed with a System shown and described herein.

The application 120 typically serves some or all of the following purposes:

1. Prevents the use of distracting phone features and applications (e.g. "black list") OR enables use of allowed applications (e.g. whitelist).
2. Alerts any driver trying to use distracting phone features and applications
3. Programmable blocking (updates white list and black list applications)
4. Collects and sends driver and driving data to Database server 70.

A "black list" of distracting phone features and applications may be defined by default e.g. per some or all of: local and regional laws and regulations, or corporate policies. Only selected features and applications ("white list"), which are considered safe for use while driving, may be allowed. In addition, the driver may define additional applications that s/he wants blocked in his own cell phone.

Mobile application 120 may start upon mobile power on and run in the background when the phone is not located inside the vehicle, waiting to detect the connection to system control unit 10.

Version control Server 80 may for example store a Vehicle parameters table including, for each vehicle, any subset of or all of the following parameters: Car ID, Module (e.g. Ext/Mobile/Server), OS (operating system), OS version, FW (firmware) Version, SW (software) Version; Language support.

Data Server 70 may for example include a user statistics log and/or a vehicle statistics log. The user statistics log may for example record any subset of or all of the following parameters: User ID, time stamp: Last use of the Mobile App 120; Duration of last use; Last alert time stamp; Total alerts issued (e.g. since last reset); Total messages that were received while driving (e.g. since last reset); Geographical coordinates of the vehicle when each message was received while driving; Unauthorized apps attempts to use (e.g. since last reset); Most used apps during drive (since last reset). The vehicle statistics log may for example record any subset of or all of the following parameters: Car ID, Speed, Distance, Average speed, Roads used.

Application Server 60 may for example store a Vehicle parameters table including, for each vehicle, any subset of or all of the following parameters: User ID, User Category (e.g. specific corporate Fleet/Insurance company to which user belongs; or that user is an individual user unaffiliated with any corporate fleet or insurance company); Region; Reference (e.g., pointer, full path, hyperlink, etc.) to the most recent blacklist; Reference (e.g., pointer, full path, hyperlink, etc.) to the most recent whitelist; Duration of usage of each application that was used while driving (e.g. since last reset).

It is appreciated that typically, a log is kept in the databases, of cellphone functionality safety-ranking lists generated by the system, including any obsolete lists as well as most recent lists, typically for each fleet; the most recent lists are typically in current use by the respective fleets.

Locations of dangerous roads may be stored in any suitable server to enable a particular vehicle's current presence on or not on a dangerous road, to be detected.

Referring now to FIG. 12, system control unit 10 may include some or all of a power unit 16; a system board; a communication board 30 and an alarm board 50.

Figure 5:
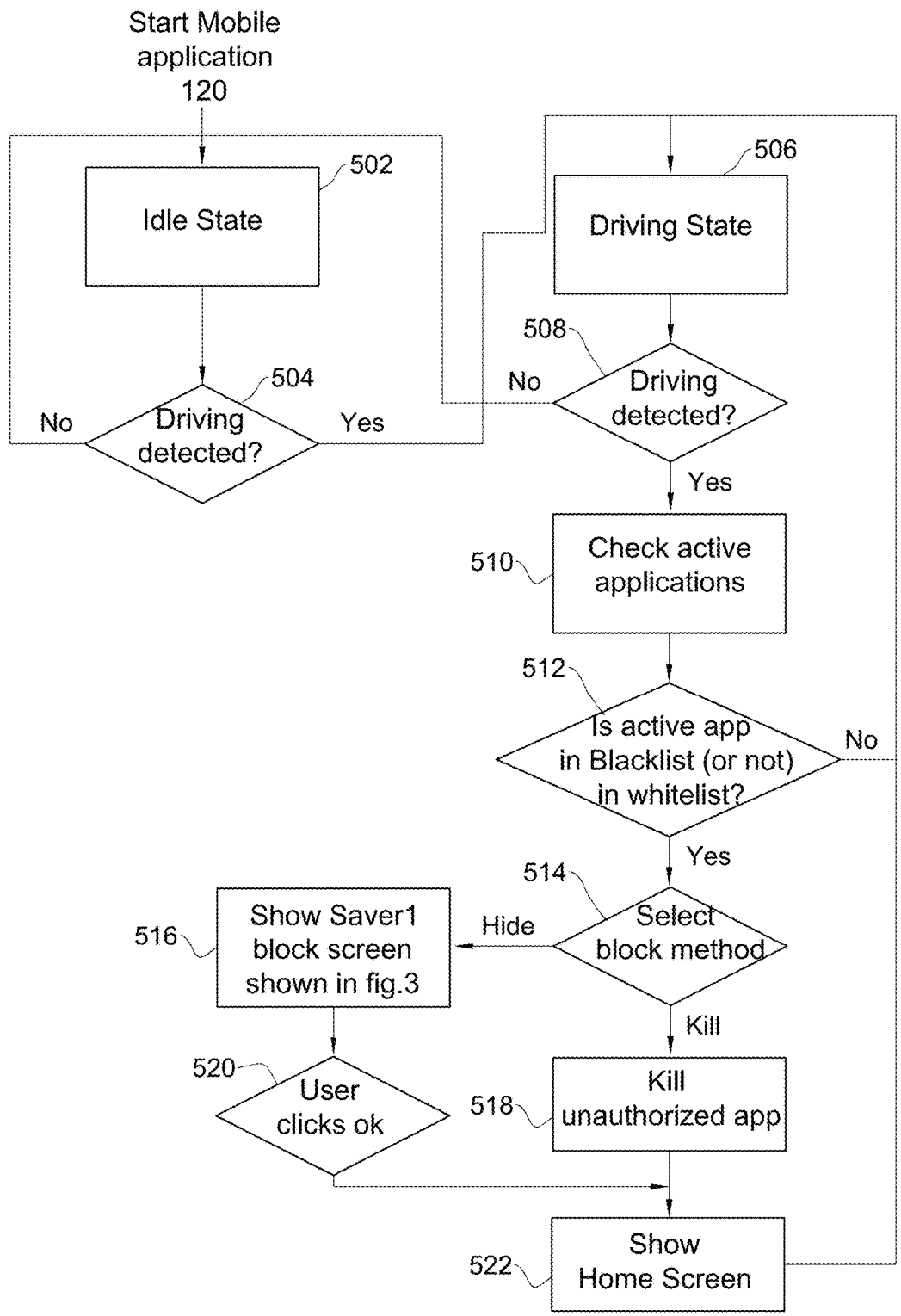
FIGS. 5-9 are simplified flowchart illustrations of methods according to certain embodiments of the present invention which respectively comprise some or all of the illustrated operations, suitably ordered e.g. as shown; each method may be used standalone or in suitable combination with other methods or with the systems of FIG. 2 or 12.

System board 20 of FIG. 12 typically includes some or all of: a controller (CPU) 22, memory device/s 24 and/or 26, DSP device 28, Bluetooth interface 34 and optional electronic elements e.g. to facilitate the communication, analysis and decision making method of FIG. 5.

Figure 8:
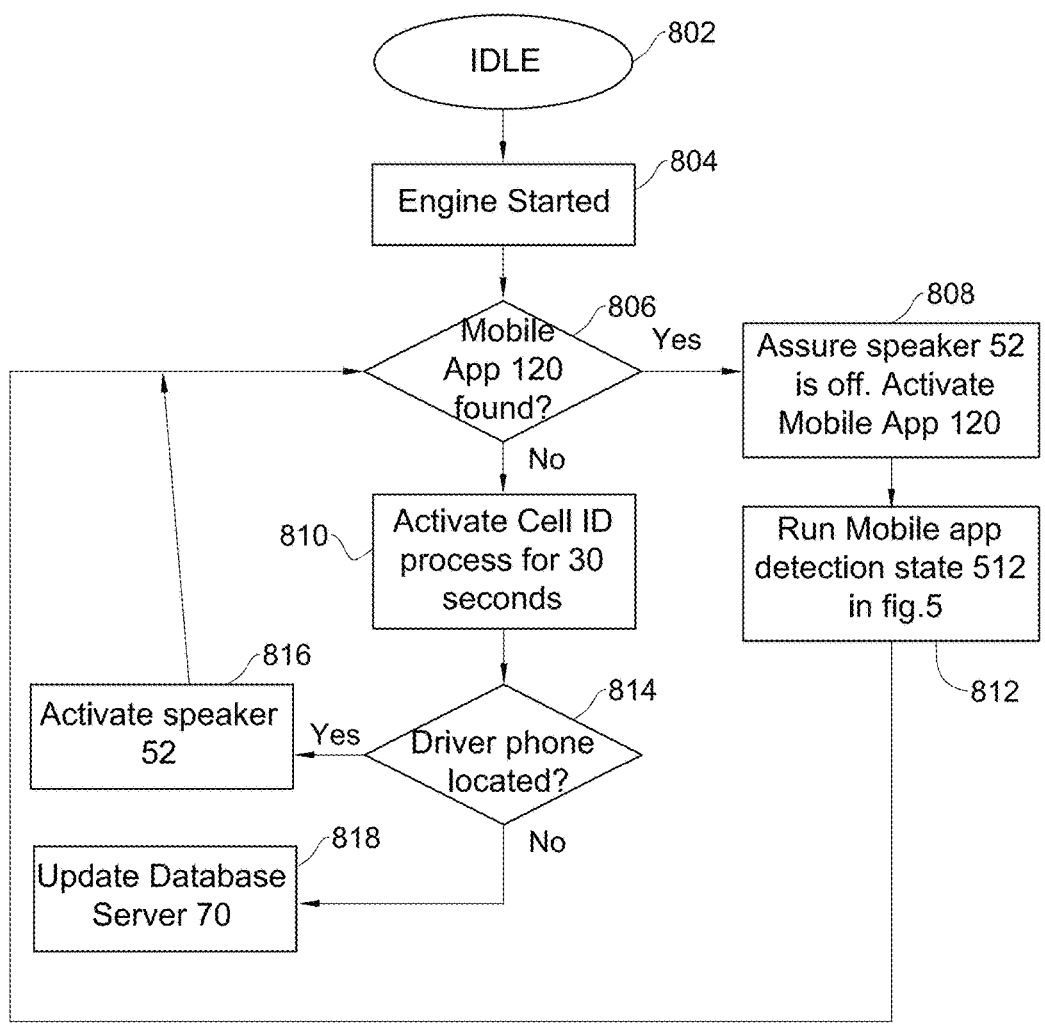
Figure 9:
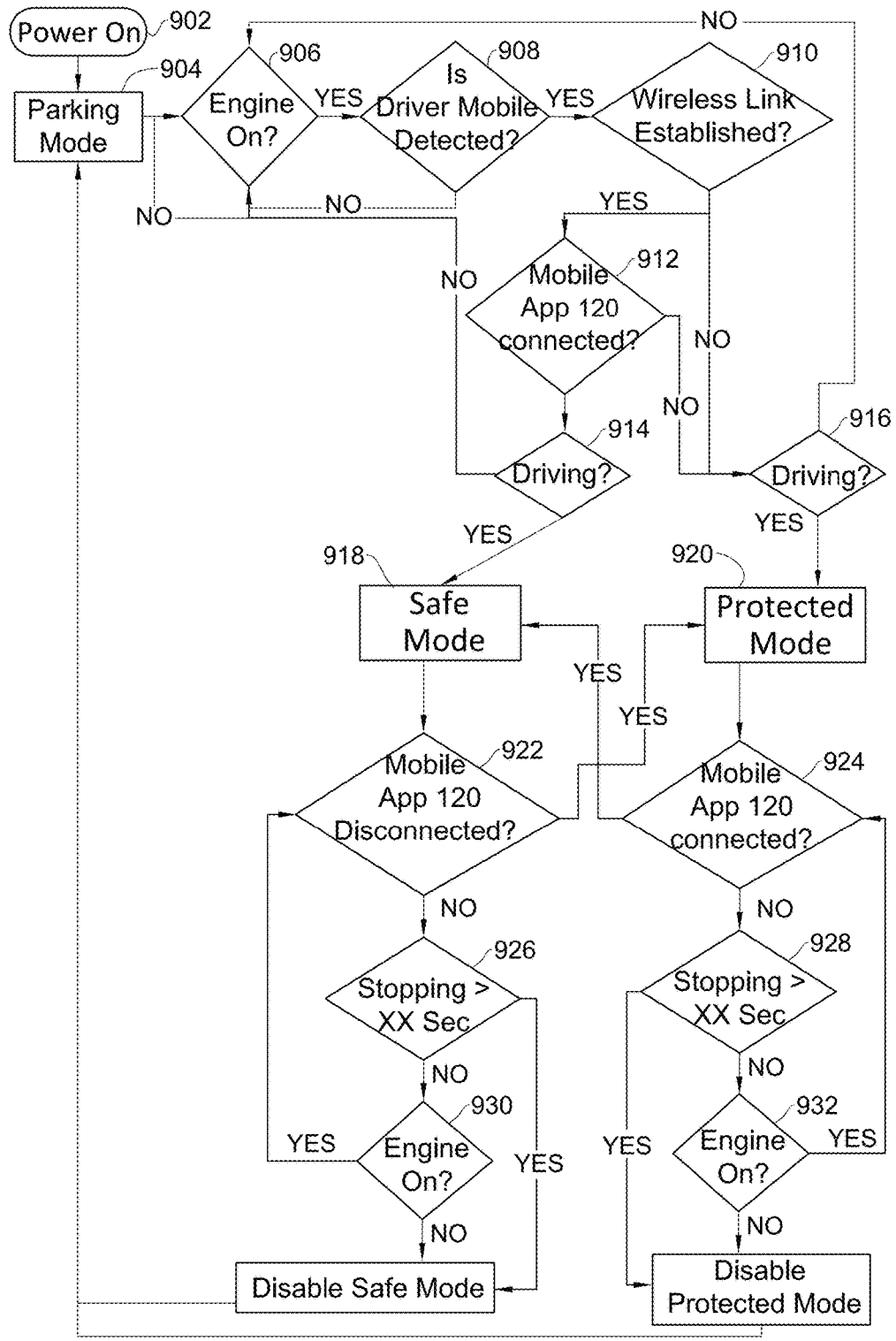

CPU 22 knows that driver disconnected the BT (Bluetooth) e.g. as shown in FIG. 9, elements 922, 924: "Mobile App connected or Disconnected". Typically, whenever the CPU 22 get's no response from the mobile app—If there was a BT (Bluetooth) connection, then the BT (Bluetooth) controller 34 in the communication module of FIG. 12 knows there was a disconnection, and may notify the system control unit (10). If there was no previous connection since the engine was started there is typically a T.O. (time out) interrupt that may be activated if-and-only-if the Cell ID module of FIG. 8 has detected a mobile device in the driver's vicinity. In this case the system would typically know that the BT (Bluetooth) is disconnected and/or the mobile app has been removed from the driver's phone—either way this is a "disconnection" which justifies entry into alarm mode.

According to certain embodiments, controller 22 deduces that driver removed app whenever no connection with the mobile app is detected, after presence of the driver's mobile has been identified. This conclusion activates the alert system that may activate an alarm, steering vibration or generate any other alert to driver, central system or other; and/or may generate an action which is undesirable to the driver and may motivate the driver to connect the BT (Bluetooth) (or alternative) or reinstall the mobile app in her or his phone, or stop driving.

Dedicated GPS, API's, gyro/compass/accelerometer or any other suitable means may be used to detect vehicle movement in isolation or in any suitable combination. Once movement is detected, a notification is typically sent e.g. to controller 22 that may instruct the mobile app 120 to check for active apps e.g. as described herein with reference to FIG. 5.

The controller 22 may include alarm generation logic that may activate any suitable alert mechanism sensible by driver and/or signal sensible by a central server, such as an alarm which may for example be produced by a speaker 50 of FIG. 12, and/or a non-audio alert/alarm e.g. steering vibration (not shown), and/or a visual alert or other alert. A visual alert may for example comprise an alert screen displayed using a vehicle's existing Multimedia screen, a LED installed on the driver's side that may blink, or any other suitable visual alert.

Bluetooth interface 34 is operative to provide wireless communication between the system control unit 10 and the mobile app 120.

According to certain embodiments, the mobile app 120 and more generally the system of the present invention including components controlled using the mobile app may have all or any subset of the following modes, each of which may be referred to by several alternative terms as indicated below:

a. safe/active/drive—vehicle is driving, system is connected
b. idle/parking—car is parked
c. alert/undesirable/blocking—car is driving, system is disconnected so alert is activated e.g. alarm is on
d. service.

Parking Mode:

When the driver enters the vehicle and ignites the vehicle's engine, the application may automatically connect with the system control unit 10, over a wireless link (such as but not limited to BT or BLE; it is appreciated that any references herein to Bluetooth are not intended to be limiting to that specific wireless technology).

Once connected, the system control unit 10 typically monitors the vehicle speed or otherwise determines the vehicle driving state.

Drive Mode:

Once the car exceeds a pre defined speed threshold (which may be used as a criterion indicating that the car is in "Driving state"), mobile app 120 typically switches to active mode, notifying the driver, and preventing access to the "black list" applications.

The system typically includes a suitable Self-Enforcing Mechanism such as the following:

In the event that wireless connection is lost, system control unit 10 may activate the Cellphone Identification module 31, typically comprising DSP 28 and A/D 29 as shown in FIG. 12, to determine the presence of a cellphone in the driver's area, in a parking or active state. Once the cellphone identification module of FIG. 8 identifies that a cellphone is present in the driver's area within the vehicle, in a parking or active state, "Alert mode" is declared and the Alert System is activated. As driving with the alert inside the vehicle is very unpleasant, the driver may re-connect the wireless connection between the mobile and system control unit 10. This may lead to "Safe mode" (if the vehicle was in motion) or to "Parking mode" (if the vehicle was parking). This "Self Enforcing Mechanism" typically assures that in any case the driver is unable to use the "black list" applications.

The application may continue to operate as described until the vehicle has stopped moving for a pre-defined period of time and the system switches to "Safe mode", as determined by the system's system control unit 10; e.g. as shown in the simplified flowchart of FIG. 6. The method of FIG. 6 may for example be performed periodically, e.g. once a day at 2 am local time.

Figure 3:
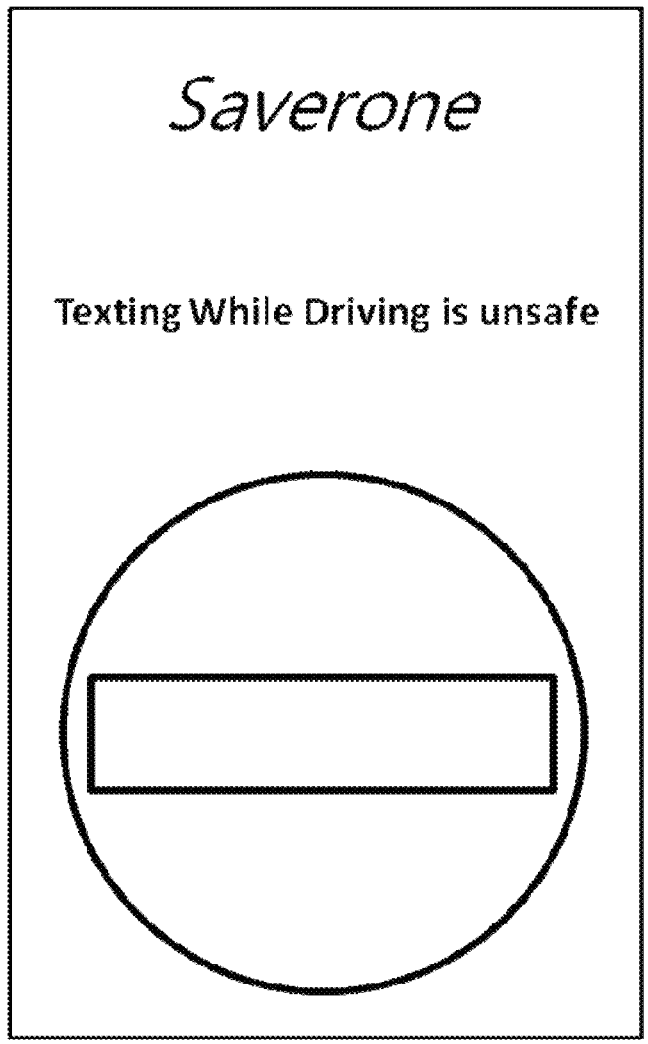

Whenever the driver tries to use "black list" applications or other dangerously distracting phone features, the blacklisted application may not open and instead a pop-up message may appear on the driver's cellphone. This can be: "Texting While Driving is unsafe" or another message e.g. as shown in FIG. 3.

The application may continue to operate as described e.g. until the vehicle has stopped moving for a pre-defined period of time responsive to which the system typically switches to "Parking mode", all e.g. as determined by the system's system control unit 10.

Programmable blocking (e.g. white list and/or black list update) is typically effected using an interaction process between mobile app 120 and the App Server 60.

The mobile app is responsible for performing the blocking—e.g. not enabling (disabling) the use of forbidden apps. (blacklisted apps).

The App server 60 stores the Whitelist/Blacklist determination tables that identify white/black parameters for each region/customer. The Whitelist/Blacklist determination tables are typically dynamically updated in order to be constantly up to date. The term "safety list" or "cellphone functionality safety-ranking list" is used herein to include both options e.g. a whitelist of cellphone functionalities e.g. apps deemed safe or alternatively a blacklist of cellphone functionalities e.g. apps deemed unsafe or alternatively any data which effectively comprises an assignment of a rank, from among 2 or more possible ranks such as safe/unsafe, to each of various cellphone functionalities such as apps, so as to rank these functionalities e.g. apps in terms of safety for use during driving. Any embodiment described herein in terms of a whitelist, or in terms of a blacklist, can more generally be provided using any cellphone functionality safety-ranking list/s to replace the whitelist or blacklist as appropriate.

An example flow of operation for the components of the system control unit of FIG. 12 may for example include any or all of the following operations, suitably ordered e.g. as follows:

1. Upon notification (e.g. via the ODB-II) of ignition of the vehicle's engine, the power component 16 powers on all of the components. of the board of FIG. 12.

2. The CPU 22& DSP 28 automatically load their respective software from the FLASH memory component 24.

3. The CPU 22 & DSP 28 each perform their respective designated Power-On-BIT activity, and establish communication with each other 4. The CPU 22 attempts to establish wireless e.g. BT connection to a cellphone in the board's vicinity while the DSP 28 processes data (e.g. RF signals) received by the RF-Antenna, converted by the A/D 29 to digital form, and handed over to the A/D 29's computation component for preliminary signal processing.

5. The DSP 28 determines if there is a cellphone in the driver's area, and notifies the CPU 22. While no cellphone has been found, the check continues (e.g. until a predetermined time-out has elapsed).

Once a cellphone has been found, the CPU 22 checks if a wireless e.g. Bluetooth connection has been established.

If not (Bluetooth connection has not been established), CPU 22 determines whether or not the vehicle is moving (e.g. using ODB-II or the GPS 26 or the cellular modem 32 to receive notification of vehicle motion). If the vehicle is not moving, CPU 22 continues these same checks periodically e.g. constantly. If the vehicle is moving, the CPU 22 initiates the alarm e.g. by activating speaker 52 and/or any other alert.

If a BT connection has been established, the CPU 22 checks if the vehicle is driving (e.g. using ODB-II or GPS 26 or cellular modem 32 to receive notification). If the vehicle is not driving, the CPU 22 keeps checking for movement of the vehicle. If the vehicle is driving, CPU 22 signals to the mobile app 120 to move into Safe Mode. If the mobile app 120 does not respond, the CPU 22 initiates the alarm e.g. activates speaker 52 and/or any other alert.

6. The CPU 22 keeps checking for the state of the vehicle (using the ODB-II or the GPS or the cellular modem to receive notification). If the car state has changed from driving to stop OR parking, AND at least 30 (say) seconds have passed since this change has occurred, the CPU 22 signals the mobile app 120 to transfer to Idle state.

7. If the engine of the vehicle is turned off, the power unit 16 may allow the CPU 22 and DSP 28 a suitable time window e.g. 5-10 seconds to close their activities in an orderly fashion.

Operation of the mobile app 120 when the system is in safe mode and once the system subsequently reverts to idle mode, is now described, according to certain embodiments. An example flow is illustrated in FIG. 5 which is not intended to be limiting.

Generally, the system shown and described herein may register to listen to incoming signals and notifications, e.g. using an interrupt service routine and registering the routine to the Operating system's interrupt handler. Alternatively or in addition, the system may define its own intent class (e.g. on Android), to be called each time an application on the blacklist (or not on the whitelist, depending on whether a blacklist policy or whitelist policy is being used) is encountered. Thus a property criteria that is not allowed during driving, such as but not limited to: CATEGORY_APP_MESSAGING, CATEGORY_APP_MARKET, CATEGORY_APP_BROWSEABLE, CATEGORY_APP_EMAIL, CATEGORY_APP_BROWER, CATEGORY_APP_WEB_SEARCH, ACTION_SEND, ACTION_SENDTO, DATA_SMS_RECEIVED_ACTION, is invoked.

Typically, responsive to a driver-user's having pressed on an apps' icon, the mobile app 120 when in active mode captures that request, e.g. using the interrupt-service-routine or the intent class if implemented as above. The mobile app then may browse through its safety list (blacklist or whitelist depending which policy is used). If the requested app is on the black list, the request may be cleared from the Operating system's messages queue or from the interrupt handler; or, if whitelist policy is used, then if the requested app is NOT on the white list, the request is revoked or deleted similarly. The system may issue a pop-up screen (e.g. as shown in FIG. 3) stating that the requested app is prohibited for use while driving.

Regarding incoming (external) events e.g. incoming text messages: the mobile app 120 typically listens for incoming messages and stores them in a local DB (database e.g. any suitable repository such as SQLite or native data structures such as but not limited to arrays, trees, hash tables, linked lists. Mobile app 120 may send an automatic response to the sender. Mobile app 120 may eliminate all means of notification that a new message has arrived including LED, sound, visual-app-icon notification e.g. by the mere fact that the messages, incoming while the vehicle is driving, are NOT handed over (and thus stored) to the relevant application/s (e.g. the driver's default SMS, whatsapp, Facebook messenger, etc. applications), for as long as the system is in active mode. Once the vehicle is no longer driving, however, the system reverts to its idle state. At that point, the messages thus accumulated are "sent" to the relevant apps, typically along with provision of all the usual incoming message notifications provided by these apps, such as turning on a LED color, playing a relevant sound, and updating an application-specific icon that there are new messages.

FIG. 4a is an example of a safety list (Whitelist/Blacklist) determination table—per Region. For example, as shown, in Israel TWD (texting while driving) may be prohibited, while in South Korea TWD (texting while driving) is not prohibited. (x=prohibited, in FIG. 4a et al).

FIG. 4b is an example of a Whitelist/Blacklist determination table which may be provided per Customer indicating that certain mobile phone functionalities e.g. apps are blacklisted (x) differentially for certain fleets; in contrast to FIG. 4a in which certain mobile phone functionalities are blacklisted (x) differentially in certain countries.

FIG. 4c is an example of a Geographical Areas determination table useful for a system in which given mobile phone functionalities e.g. apps, are blacklisted for driving situations deemed dangerous on the same mobile phone. The table of FIG. 4a indicates that various areas are differentially deemed dangerous (x) in various geographical continents.

Locations of dangerous intersections and roads may be uploaded from national transportation agencies. For example, lists of dangerous roads in Israel are published in Israel e.g. by an NGO called "Or Yarok" ("Green Light").

The tables may be accessed by programmable system logic, either centrally or on-board the vehicle or the driver's phone, to determine which apps or categories of apps are blacklisted for a given vehicle at a given time, belonging to a given fleet and being within a certain driving state e.g. located at a given location e.g. as indicated by vehicle API and/or GPS data. For example, a specific app may be blocked for a specific vehicle at a specific time, if stored typically dynamic tables and typically programmable logical relationships therebetween indicate that the combination of the app's characteristics, the road or intersection, or speed, or time of day the vehicle is driving, and the vehicle's fleet membership justifies blocking the app. The same app may not be blocked for a different vehicle or at a different time, if stored typically dynamic tables and typically programmable logical relationships therebetween indicate that the combination of the app's characteristics, the road or intersection, or speed, or time of day the vehicle is driving, and the vehicle's fleet membership, do not justify blocking the app.

Determination tables are typically dynamic e.g. may be updated, using any suitable mechanisms, including for example:

$1^{st}$ option for dynamic update: Decision process to decide whether each app is a whitelisted or blacklisted app. Each app provides basic parameters. App Parameters to use in the decision process may include but not be limited to all or any subset of:

Package name—a unique identifier given to an application by the developer

Category—a containing category such as but not limited to: productivity, communications, tools, travel, etc. . . . specified by the developer when submitting to the relevant publication store Store description and tags Permissions Supported screen resolutions Supporting of multiple versions and OS variations Localization Integration of Custom Scheme Url Store popularity, reviews, and ranking Use of APIs Memory footprint CPU load Battery consumption A number of methods may be used to classify applications such as but not limited to:

Application behavior profile:

Monitoring of an application behavior profile on the device may be used to detect the type and nature of the application. The app is designed to use as little computation power, communication traffic and battery as possible and may optionally integrate special APIs such as but not limited to voice recognition, gestures, text to speech, navigation.

The app typically runs in the background at least while in Idle mode and possibly also in other modes. The app typically does not need to listen to content of phone calls or text messages, but rather only to events, signals, and intents invoked by the operating system when such an activity starts. Data regarding events, signals, and/or intents may be used as indications of the purpose of the app, and may be used to predict the app's usage patterns. For example the whitelist/blacklist determination process, e.g. as shown herein, might use such data for preliminary screening of apps on the mobile device e.g. if based on known apps, the size of the app is found to be an indicator of its usage hence of its level of danger to a driver.

It is appreciated that according to certain embodiments, cellphone functionalities are treated in more than 2 levels e.g. 3 levels such as: unauthorized (blacklisted), slightly hazardous but suitable for low-risk driving e.g. driving on low-speed roads or roads which are not known to be accident prone; and highly hazardous hence unsuitable for any type of driving.

Application Segmentation and Localization: In order to understand the extent and circumstances in which an app may be used, the app's declared category, permissions which may be required, localization, support of screen resolutions and/or operation systems may be analyzed. The typical type of user that uses this app may also help predict why, when, and where the app may be used e.g. is this an application for drivers or gamers or for social purposes.

Application content and ranking: An app may also be classified by the public content it presents, whether internally, or by the app's store name, description, and tags. This information is analyzed to extract textual context.

The ranking of an application may show its relevancy, and the priority of its classification.

$2^{nd}$ option for dynamic update: Another method by which the determination table may be updated includes collaborated filtering (usually above a large number, typically 10K users): $1^{st}$ phase: Collect statistics of apps in use using Wisdom of crowds) to create an initial whitelist/black list database. In a $2^{nd}$ phase, database administration tools and panel may be employed to maintain (e.g., backup, upgrade operations.) and update (e.g., add fields to an existing table, add a new table, delete a table, etc.) the central database.

Crowdsourcing may be used to facilitate app classification e.g. by collecting data from the users of these apps. Users may be prompted to help classify applications as "safe" or "dangerous", thereby to help save lives.

According to certain embodiments, apps are automatically blacklisted unless or until an app can be shown to have certain predetermined whitelist eligibility criteria which may be global or be predetermined per fleet or geographical area.

App server 60 may use the wisdom of the crowds method by communicating with public DBs or services, such as a database created by wefi.com, to receive a table of mobile apps that are being used while in motion, and if possible while (active) driving. Once data is received, the app server may analyze each app in the table and classify each app—according to a given set of parameters—whether the app is a "Blacklist" or a "Whitelist" app, and add the app to the relevant list, if necessary.

The system shown and described herein may also create its own users database and use its logger to analyze app usage while driving.

The system shown and described herein may allow the user to report on an app that might cause distractive driving. This input may be logged & saved in the app server, and may be characterized by the server according to external DBs (e.g. wefi.com) or a pre-defined set of parameters such as a "backlist" or "whitelist" app.

The Mobile app 120 may for example perform, on apps which a driver may desire to use when driving, either a Whitelisting decision making process or a Blacklisting decision making process.

Depending on the user profile, the appropriate Whitelist/Blacklist determination table may be used in the "Blacklist" application blocking process—either a per region table (usually for private users) or a per customer table (usually for fleets).

Figure 7:
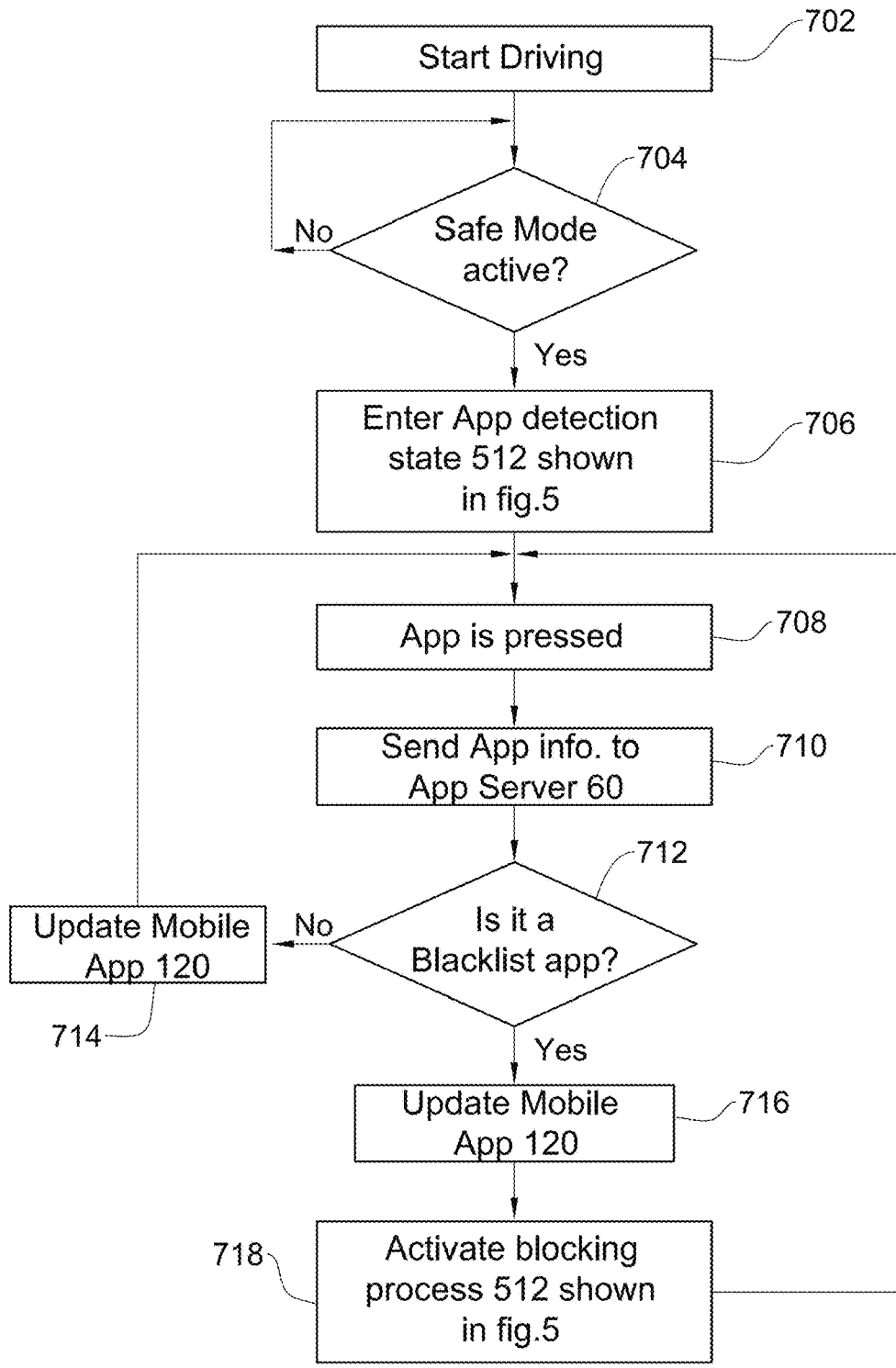

The blocking of the "Blacklist" application may be accomplished e.g. as follows: local management—e.g. the decision to identify an application as blacklist app or not-whitelist app is made in the phone, OR central management—e.g. the decision to identify an application as blacklist app or not-whitelist app is made in the App Server. FIGS. 6, 7 are simplified flowchart illustrations of local and central management aspects, respectively, of a mobile phone functionality blacklisting/blocking process. It is appreciated that operations 712, 714, 716 in FIG. 7 may be performed in the app server 60 of FIG. 2.

The screening process in the driver's phone can be done either by blacklisting or by whitelisting:

According to certain embodiments, in order to use either method, the mobile app 120 must be in "Active" mode.

Mobile app 120 may enter "Active" mode if & when some or all of the following criteria are met:

The system shown and described herein detects a mobile device in the driver's area.

A wireless (Bluetooth) link has been established between the system shown and described herein and the driver's mobile device.

The system shown and described herein detects that a speed threshold has been passed by the vehicle.

Upon user selection (icon pressed) of an application to use during driving (e.g. Safe Mode), the Mobile app 120 may identify the requested app, and search for the app in the Blacklist local copy that resides in the driver's phone.

If an app requested by a driver is found in the Blacklist's local copy, the Mobile app 120 may either disable the driver-requested app or send the driver-requested app to the background, and in any case may display a pop-up screen stating "Texting while driving is unsafe", and return to the home screen (the pop-up message may be modified in each region or per local policy).

In addition, Mobile app 120 may block all UI interactions with the blacklisted app, including audio & visual notifications, pop-up messages, etc. . . . the Mobile app 120 may store incoming messages for future display. These messages may be available to the user, both by notifications (audio & visual) and by appearance as a "new message" in the corresponding app, once the app has exited Safe mode and entered Parking mode.

If the requested app is *not* found in the Blacklist's local copy, the Mobile app 120 may allow usage of this app while communicating with the server to get the latest blacklist file on the server. Once the update is done, the Mobile app 120 may re-evaluate the status of the app, and act accordingly.

If communication to the server is unavailable for any reason (e.g., data communication is lost due to driving through a tunnel, user data package restrictions, etc.) the decision may be made using only the local copy.

Once communication to the server is restored, the sync process with the server may be resumed, and file update may commence.

Upon user selection (icon pressed) of an application to use during driving (e.g. Safe Mode), the Mobile app 120 may identify the requested app, and search for the driver-requested app in the Whitelist local copy that resides in the driver's phone.

If the requested app is found in the Whitelist's local copy, the Mobile app 120 may allow the use of the app.

If the requested app is *not* found in the Whitelist's local copy, the Mobile app 120 may either disable the driver-requested app or send the driver-requested app to the background, and in any case may display a pop-up screen stating "Texting while driving is unsafe", and return to the home screen (the pop-up message may be modified in each region or per local policy), while communicating with the server to get the latest Whitelist file on the server. Once the update is done, the Mobile app 120 may re-evaluate the status of the app, and act accordingly.

In addition, Mobile app 120 may block all UI interactions with the blacklisted app, including audio & visual notifications, pop-up messages, etc. . . . the Mobile app 120 may store incoming messages for future display. These messages may be available to the user, both by notifications (audio & visual) and by appearance as a "new message" in the corresponding app, once the app has exited Safe mode and entered Parking mode.

Once communication to the server is restored, the sync process with the server may be resumed, and file update may commence.

FIG. 5 illustrates an example flow for the Mobile application 120; some or all of the illustrated operations, in this flow and others herein, may be provided, in any suitable order e.g. as shown. In operation 514, the block method may comprise disabling a request/message from getting to its destination, e.g. by listening to such requests/messages and temporarily "taking them over" (e.g. storing them in local storage rather than immediately handing them over to the driver's existing SMS/whatsapp/Facebook messenger etc.; and retrieving them from the local storage and delivering them to the relevant user's app, only once the user is no longer driving i.e. only after the system next reverts from Safe mode into idle mode). Typically, the blocking is accompanied by issuing a warning e.g. pop-up screen (FIG. 3) visible to the driver, stating that the app is prohibited for use while driving.

"Kill" step 518 may for example comprise getting a blacklisted (or not-whitelisted) app's PID from the operating system and calling a system command, such as killProcess/runFinalizersOnExit/sleep, to halt the blacklisted (or not-whitelisted) app.

Suitable synchronization between App Server and Mobile app 120 is provided and may for example be as follows: The server 60 may send an initiated update once a day, at a designated hour (e.g. 02:00). The app 120 may send an initiated update request to the server 60 periodically e.g. once a day, at a designated hour, such that the update request follows e.g. 12 hours (say) from the server's initiated update (e.g. 14:00).

Upon an installation of an app on the user's device, the Mobile app 120 may search for the installed app on app 120's Blacklist/Whitelist. If the app is not found on the list, the Mobile app 120 may either contact the server for a list update and re-search the updated list, or may apply a suitable decision-making process, that may be based on the installed app's parameters, features, and characteristics (e.g. as defined in the app's description), and assign the app to the Blacklist/Whitelist local copy accordingly. Once the local copy is updated, the Mobile app 120 may update the server with the updated list. The server may merge the new copy with its current copy, in order to prevent multi-entries and/or deleted entries.

FIGS. 6 and 7 respectively illustrate local and central management operations of an example "Blacklist" application blocking process.

Data collection and transfer to Database server 70 of FIG. 2 may optionally occur. For example, mobile application 120 of FIG. 2 may collect some or all of various data elements regarding the car e.g. car route & location throughout the call, maximum and average speed; and cellphone data e.g. some or all of: phone number & ID, call log, conversation duration and additional data items. These parameters may be collected from the GPS, accelerometers, gyro and compass and other sensors in the cellphone and from the call log. The data may be sent during off-peak time periods to the servers 60, 70, 80 of FIG. 2 for storage and future analysis/use.

The mobile application 120 may support some or all of the following features: When an SMS/whatsapp or other message is sent to the driver from a number that is part of a pre-defined numbers list, the system may act according to any one of a few alternatives:

A unique sound may be heard and the driver may be able to stop and read the message.

In any case, the sender may get a message, such as "I am currently driving and will get back to you soon. You may call me".

The Cellphone Identification module of FIG. 8 may identify the presence of a cellphone in the driver's seat area by receiving and analyzing RF signals of the cellular modem in the mobile phone. It is appreciated that FIG. 8 represents only one possible state machine for this module and alternatively, only some of the states or transitions there between may be provided, as illustrated or in conjunction with other suitable states and transitions.

According to some embodiments, the module of FIG. 8 is active for a predetermined time period, whose length may be pre-determined after suitable testing to ensure that a phone, if present, will be located during this period e.g. to ensure that at a high level of confidence, a no-phone finding after the period has elapsed indicates that no phone is present in the vehicle (in the vicinity of the driver).

The Cellphone Identification module of FIG. 8 may for example operate in accordance with any of the following techniques (AOA.DOA, TOA, TODA, channel fingerprinting based on power level or delay spread), individually, or in any suitable combination.

Figure 10:
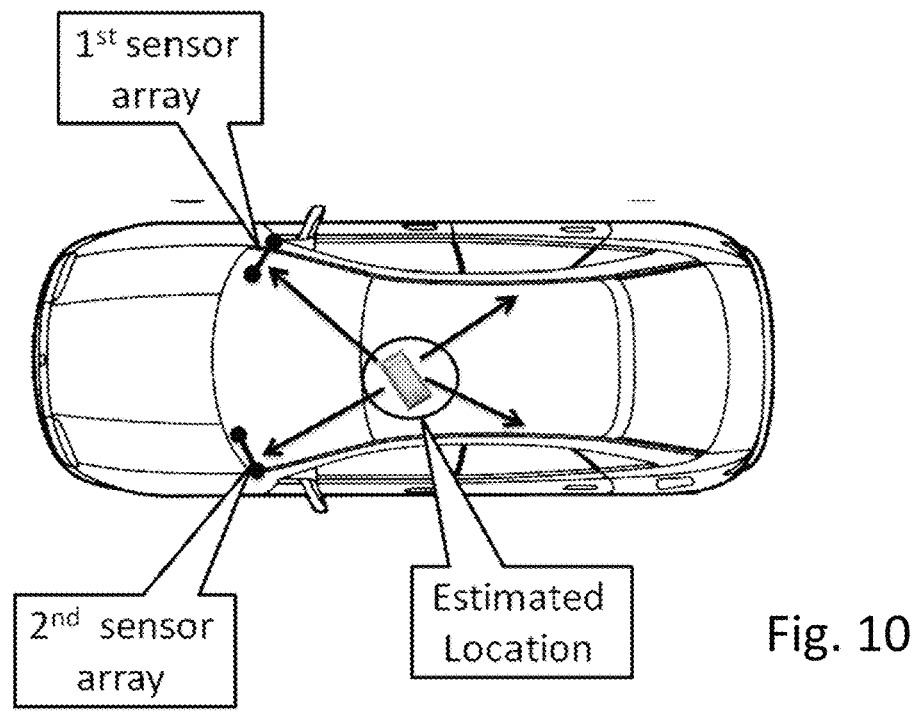
FIGS. 10, 11 are simplified semi-pictorial illustrations useful in understanding certain embodiments of the present invention.

When Angle-Of-Arrival (AOA)/Direction-Of-Arrival (DOA) technique is employed, several sensor arrays may be placed in the vehicle. Each sensor array element estimates the angle of arrival of the signal. By placing two or more arrays, and crossing two or more vectors, location of the phone can be found, e.g. as shown in FIG. 10. Time-Of-Arrival (TOA) technique assumes that the sensor and the transmitter share the same clock (are synchronized) and that the transmission is not continuous (e.g. pulses). The TOA of each signal may indicate the distance of the mobile phone from the sensor.

Time-Differential-Of-Arrival (TDOA) technique estimates the mobile phone's location by the time difference of the arrival of the signal from the transmitter to several sensors that are relatively widespread in the vehicle. This can be realized e.g. by correlating in the time domain the sample vectors derived at each of the sensors and estimating the exact time difference between them.

Figure 11:
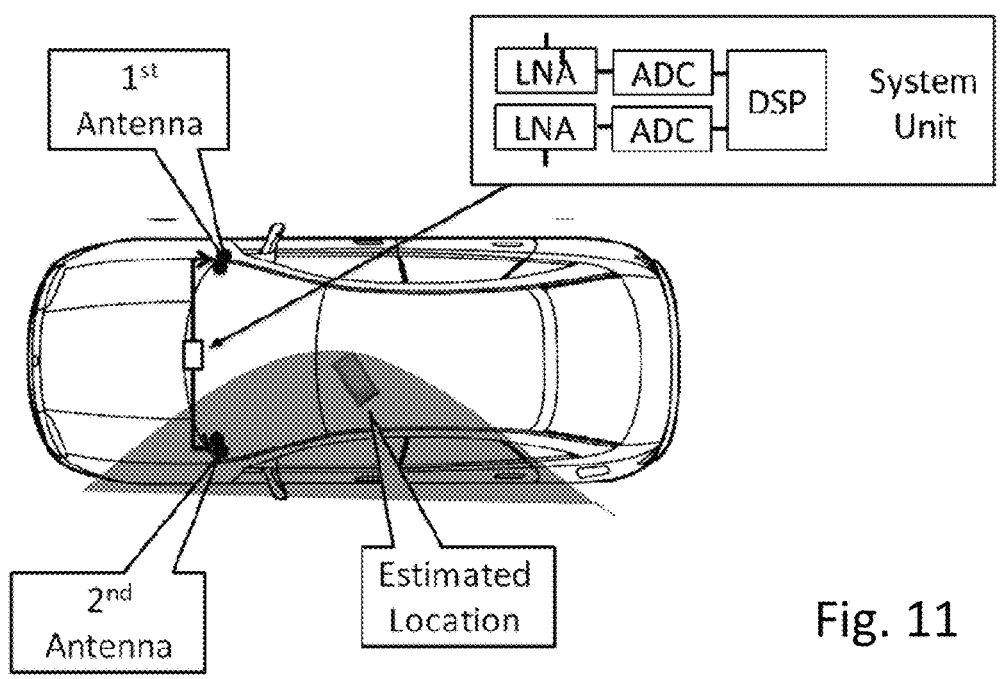

In order to implement this technique, several RF sensors may be disposed at locations in the vehicle that maximize the probabilities of successful detection. Each sensor typically comprises a suitably sized antenna, an LNA and an Analog-to-Digital Converter (ADC). The sensor samples may be transferred to a signal processing component that may run a computerized process that decides whether or not the mobile phone is located in the vicinity of the driver. The higher the ADC rate, the better the location results. Known algorithms (e.g. acoustic location estimation, non-linear least squares estimation) that use the TDOA values typically result in a dichotomic 3D surface characterized in that the phone is located in one of its sides; and a decision may be made on this basis if the phone is present or not, e.g. as shown in FIG. 11.

Channel Fingerprinting functionality may have an absolute power level or relative power level. Wide-band sensors may be provided, e.g. covering a frequency span of, say, 0.7-2.7 GHz. Omni antenna may be provided. Alternatively or in addition, partially directional antenna with higher gain may be provided, directed to the interior of the vehicle generally or to the driver vicinity.

Link budget (e.g. power level computations) may be effected by comparing the received signal to signals from other mobile devices not in the car. DSP Signal processing may follow a flow employing one or any suitable combination of the following options:
1. Detection of a new suspected signal at one or more sensors (at one or more of the bands)
2. Computation of received power level of the suspected signal from all the sensors
   a. Of the whole signal/carrier
   b. Per sub-carrier of the signal
3. Estimation of the number of signal sources inside the vehicle
4. Estimation of the location of each signal source
   a. Model-based
   b. Aided learning (i.e. Neural Networks)
5. Improving the estimations based on continued learning Signal to Noise Ratio (SNR) may be computed as a function of the bandwidth of the system; WB (wideband) noise may be inserted to the receiver, if it is desired to sample 100 MHz of BT or WIFI.

In a Power Level based implementation, the locating system knows the transmitted power value and the propagation characteristics of the interior of a vehicle. The transmitted power value and frequency range of the mobile phone are known for each region, e.g. based on the cellular standard. The propagation characteristics may be studied using in-vehicle repeatability simulations in order to attain a particular level of precision. Sensors are typically placed to be in line of sight of the phone when the phone is in a particular zone. FIG. 4 in "measurements and characterization of Ultra wideband propagation channels in a passenger-car compartment", 2006 IEEE 9$^{th}$ Int'l Symposium on Spread Spectrum Techniques and Applications, p. 228, by Takehiko Kobayashi, illustrates several power level losses between transmitter and locations at a horizontal plane grid in a vehicle for three different bandwidths where power is collected.

In a Delay-spread based implementation, a multi-path signature between transmit and receive locations is used. This channel state data carries data regarding the interior location that may be used for determining mobile phone location. FIG. 9 in the Kobayashi publication shows a delay spread between transmitter and receiver inside a vehicle in two 25 cases, when a passenger sits near the driver (b) or when this seat is not occupied ((a) in Kobayashi's FIG. 9).

Data from the sensors may be analyzed e.g. using machine Learning technology. Analysis may be based on suitable methods such as but not limited to Neural Networks and/or Markovian methods e.g. to store location data and events such as but not limited to phone calls and mobile use events to analyze the behaviors of the RF signals for these events and given this data and use the results for optimizing the location IDprocess e.g. of FIG. 8, thereby to enhance accuracy of detecting presence of a mobile phone within the vicinity of the driver's seat.

Over-The-Air-Keying: In order to support the different cellular frequencies, the Cellphone Identification module 31 when operating e.g. as per the method of FIG. 8 may have the capability to be configured to any region/country standards, based on the geographic location of the system in a specific vehicle. This may be done by loading a configuration file directly or from the Version control server 80, through the cellular network, using Over-The-Air-Keying method.

The Cellphone Identification module 31 when operating e.g. as per the method of FIG. 8 may support 3G, 4G/LTE and other cellular networks and may be capable of detecting any selected cellular receiving frequency bands, based on regional deployment and availability.

In order for the system to achieve a seamless and transparent connection with the driver's phone, and be able to operate without driver interaction e.g. without connecting a cable, wireless communication may be employed.

The system may support a wireless transceiver, such as Bluetooth, BLE, Wi-Fi, NFC or other means which can communicate with any supporting mobile phone. The wireless interface may support suitable signaling and data protocols in order to establish a typically wireless data link to the driver's phone, and to enable communication with the application 120 installed on the phone.

The interface may allow automatic detection and pairing of the driver's phone(s) (the system may support the detection of more than one e.g. up to two (2) cellphones in the driver's area) with the system, in order to identify the driver and facilitate compliance acknowledgement.

The system shown and described herein may use either a secured communication protocol such as but not limited to AES128, Base64, ZLIB or non-secured communication protocols, such as encoded, encrypted or other. These may be constant or dynamic methods.

The Alert System e.g. as implemented by the alarm board 50 of FIG. 12, is designed to output an alert e.g. driver-audible alarm, when directed by the Cellphone identification module. The alert system may alert the driver regarding disconnection of his/her mobile device from the system shown and described herein by any suitable means such as but not limited to some or all of:
1. Sound alert that may be on until such time that the driver connects his/her cell-phone to the system shown and described herein. There may be time-triggered escalations of the trigger(s). Each 30 seconds, the sound alert frequency may become faster & the sound may be at a higher pitch.
2. Should the BT (Bluetooth) connection be lost/disconnected, the mobile app 120 may for example flicker the driver's phone screen using red light
3. Use the vehicle's multimedia screen to show an alert screen
4. A LED installed on the driver's side in the vehicle that may blink
5. A vibration to the driver's seat
6. A vibration to the steering wheel The alert system may be operative to transmit various sounds and volumes, depending on the system and vehicle's state. A different alarm sound may be generated for a scenario of a driver entering the vehicle with the BT (Bluetooth) disconnected and for scenario of a driver disconnecting the BT (Bluetooth) during driving (e.g. "Safe mode"). Additional alarm sounds may be generated for additional scenarios.

Any suitable Vehicle State Detection functionality may be employed. Vehicle movement may for example be detected using data from one or more of: indication from the vehicle's ODB-II, GPS, APIs (such as any or all of: gyro, compass & accelerometer) or a combination. Dedicated GPS (e.g. GPS 36 in FIG. 12) may be provided in order not to be dependent upon operability of alternate GPS e.g. driver's cellphone's internal GPS. The APIs may be used for accurate detection whenever a GPS signal cannot be obtained (e.g. in a tunnel or garage).

Any suitable criteria (e.g. notification that the engine is on, notification that the gear is not in parking or neutral, notification re speed of vehicle) or logical combination thereof may be employed to determine that the car is in motion as opposed to being parked, e.g. in order to determine whether to be in active mode or idle mode.

Any speed above a pre-defined threshold may be interpreted to mean that the vehicle is being driven, and vice versa. The system may be off when the vehicle engine is off.

The system shown and described herein may be operative to collect vehicle's parameters, transmit them and/or store them, and/or use them with/without synchronizing them with the driver's cell-phone data.

Servers may include some or all of: Version Server 80—stores and manages SW & FW versions; the software and firmware of the system shown and described herein and application may be operative to be updated remotely from and by Version control server 80. This may be done either by push or pull.

Application Server 60—stores and manages white and/or black lists Database Server 70—stores and manages user profile, driving and cellphone parameters and statistics A stand alone solution may include some or all of:
System control unit—HW&SW
Speaker
Cell ID
Mobile app Or, the system may be integrated into a car manufacturing process.
Components may include:
Embedded system control unit software
Cell ID
Mobile app The embedded system control unit software may be loaded to the car's infotainment system, communicating through the car's wireless communication system with mobile app 120 in the driver's Cellphone. In the event that communication with mobile app 120 is lost, the music in the car's speakers may be decreased and an alarm sound may be transmitted through the speakers. The Cellphone identification module (Cell ID) may be implemented using the available HW components in the car.

The system may be integrated with existing/other party's HW device, where the existing device may contain the system control unit's elements, BT (Bluetooth) and (optionally) a speaker. Components include some or all of:
Embedded system control unit software
Cell ID
Mobile app
(optional) speaker In-vehicle hardware components of the system are typically pre-installed, as is the mobile application component 120, if provided, in the driver's phone. The system control unit 10 and other system components, including, but not limited to some or all of: Cellphone identification module of FIG. 8, alarm system 50 and power module 16, are typically permanently installed inside the vehicle, by a professional certified installer, in a concealed location (e.g. under dashboard, under the hood or elsewhere) which prevents tampering and unwanted access.

The mobile application component 120 may be downloaded to the driver's phone directly e.g. from Google play, App store or from the Version Control server 80, depending on the phone make and model. The application 120 may also be provided as part of the SIM Toolkit applications of the phone operator, and activated from within the SIM card.

Following successful installation of all components, the mobile application installed in the driver's phone typically communicates with the system control unit installed in the vehicle. This communication is performed over the wireless interface typically using a suitable protocol typically pre-defined for the system shown and described herein.

Typically, when the system control unit is activated for the first time, system control unit 10 searches for a wireless connection to the driver's phone, in which the application component is pre-installed. Similarly, when the mobile application is started for the first time, app 120 searches for the system control unit's wireless interface connection.

Once the system control unit 10 and the driver's phone are connected and have established a communications link, the mobile application 120 may be operative to connect automatically to the system control unit 10 every time the system is activated, over the wireless interface, without any user intervention.

Typically, the system control unit 10 is turned on every time the vehicle engine is started, automatically searches for the driver's phone wireless interface connection, and when the driver's phone is detected, an automatic wireless interface link is established, which allows the Mobile application 120 to communicate with the system control unit, and vice versa.

If there is no communication with Mobile application 120; System control unit 10 may activate the Cellphone Identification module, which may operate as described in FIG. 8.

As described above, operation modes of the system shown and described herein may include some or all of:
Parking Mode:
The system shown and described herein is operating but is not taking any action since the vehicle is not in drive mode. The system control unit 10 monitors the vehicle, and the mobile application 120 operates in the phone background monitoring the system control unit.
Safe Mode:
The vehicle is driving while the Mobile application 120 is active and the driver's phone's "black-list" of applications and services is blocked e.g. as described herein or as shown in FIG. 5.
Alert Mode:
The vehicle is driving and no connection is detected between the Mobile application 120 and the system control unit 10, while Cellphone Identification module unit identifies Cellular phone in the driver's seat area. In this case, the Cellphone Identification module of FIG. 8 instructs the alert system to activate an alert e.g. through the dedicated buzzer 50, the car's speakers or any other means.

Parking Mode operation typically comprises the following: while the vehicle engine is running, the system control unit 10 monitors the driving state of the vehicle. As long as the vehicle is not moving, even if the engine is running, the system remains in parking mode, working in the background.

When the system control unit 10 detects that the vehicle has started driving, system control unit 10 typically switches from Parking mode to either Safe mode, thereby to block use of the black-list applications in the driver's phone, or to Alert mode, thereby to activate buzzer 50 and/or any other Alarm System.

Safe Mode operation typically comprises the following: The mobile application switches from parking mode to active mode, and places the driver's phone in safe mode, preventing use of the "black list" applications.

The mobile application may notify the driver, by a screen pop-up message, or other means, of the phone having switched to safe mode, and may notify the system control unit that the action has been completed successfully.

The mobile phone may remain in safe mode as long as the vehicle is driving, and the Mobile application 120 is installed and activated within the driver's phone.

Mobile application 120 may store the messages that were sent and blocked by the system when the phone was in "safe mode" (including but not limited to text and WhatsApp messages) and may also store the geographic location and/or speed of the vehicle when each message was received typically in conjunction with a suitable time-stamp. This may be used for presenting a geographic map of the vehicle location and texting status or for other analysis. This information may be saved in the Cellphone memory, and when the car is in parking mode, the user will be operative to read this information.

Alert Mode operation typically comprises the following: In the event that communication of the System Control Unit 10 of FIG. 2 with the Mobile application 120 is lost, e.g. the application 120 is not installed or the Wireless interface is turned off while driving, the system control unit may activate the Cellphone Identification module system 31 when operating e.g. as per the method of FIG. 8 and if system control unit 10 discovers a cellular phone, the System control unit may activate an alert through a dedicated buzzer or other alarm 50, the car's speakers or any other means.

Once the driver's phone re-connects to the System control unit 10, the system may switch to Safe mode, enabling the driver to drive safely, using the white-listed applications in his phone.

When the system shown and described herein detects the vehicle has stopped moving completely for a pre-defined time period of xx seconds (where xx may be a configurable parameter), the system typically switches back to "Parking mode" and enables full phone functionality. The time period xx is used to ensure that the vehicle is parking and has not, for example, simply stopped for a short time e.g. at a stop light.

The system shown and described herein may use data indicative of the parking gear shift position (e.g. through the OBD-II port) to detect and differentiate between short and long stopping periods and shift the system to "Parking mode". FIG. 9 is a state of machine illustration depicting example transitions between operating modes, some or all of which may be provided.

Alert option: According to certain embodiments, Mobile application 120 may identify an emergency situation e.g. by detecting that vehicle de-acceleration has exceeded a pre-determined de-acceleration threshold and may initiate a call to emergency agencies, e.g. police, fire fighters etc.

A service mode may be available for the vehicle owner (e.g. a car fleet's owners) to disable the system shown and described herein. This may be used when the vehicle is being driven by specific personnel without Mobile app 120.

The vehicle owner may have a code and may be given the option to connect to the system shown and described herein through the wireless interface, and to enter his code and responsively system operation may be disabled, either temporarily, for a pre-defined time period, or permanently, e.g. until the code is re-entered.

Technological advantages of certain embodiments may include some or all of the following:

a. The system may collect driver statistics that may be used by the fleet or insurer to identify driver behavior, give the driver a rating, and support driving improvement activities. Since the system shown and described herein cannot be removed (otherwise the alert may be activated) a fleet or insurer can rely on the system being installed in the vehicle and can provide reliable user profile and data and support two way communication between the fleet manager and the vehicle for e.g. for real-time indication regarding a driver's misbehavior and/or for on-the-fly communication with a rogue driver.

Optionally, a log may be kept of the driver's phone usage to provide the company's insurer with data ensuring that: a) the system is, indeed, installed and functioning; and/or b) in the event of an accident, proof that the accident was not caused due to a driver texting while driving.

Optionally, the alarm mode is logged and each time the system enters or exits alarm mode, these events are time-stamped, and the car's position during that time interval is tracked to determine whether or not the car was moving while the car was in alarm mode. This is useful for proving that a specific vehicle either was in a safe mode preventing texting, or was not moving, since typically, the adverse effects of alarm mode e.g. the bothersome alarm has the effect of preventing the driver from driving until he has reconnected the system e.g. until the system has been shifted out of alarm mode.

Each driver may have a profile, stored in database server 70. Each driver may receive a safe driving ranking including, say, points for every message that was sent to him (text, whatsapp, etc.) and blocked during driving. A high rank may suggest a safer, more conscious driver, and may lead to prizes or other benefits.

The system shown and described herein may connect to Android Auto or Car Play or other systems (e.g. depending on the legacy system in each vehicle) e.g. through the wireless interface. Dedicated applications may create a connection between the system shown and described herein and various features in these systems.

The servers of FIG. 2 may be employed to log various parameters of the vehicle and the driver, transmitted from the system in each individual vehicle. These may be used, for example, for creating Internet Of Things applications.

A vehicle interface may be created using the vehicle's OBD (On Board Diagnostics) interface which enables access to the vehicle's internal data bus (also referred to as CAN bus), to the vehicle's main computer and parametric data of the vehicle's sub-systems. The interface provided by the vehicle may for example be defined in the OBD-II (On Board Diagnostics 2) standard which is used in this description by way of example. The OBD-II standard also provides a list of vehicle parameters (PIDs) which are available along with how to encode the data for each parameter. Although the parameters may vary between auto makes and models, there are basic parameters which are standard throughout the industry, including Speed, Engine RPM, Odometer, Gear, etc.

The mobile app 120 may monitor the vehicle's engine state and driving state through various means e.g. some or all of: GPS & power status, the vehicle OBD-II or FMS interface.

For example, engine on and off may be detected by the power to the System shown and described herein, RPM parameter of the OBD-II interface (any RPM value above 0 (zero) is interpreted to mean that the engine is running, and vice versa) or other means. This triggers the system to revert to parking operating mode, and start searching for the driver's phone to connect.

The system shown and described herein may connect to the ODB of the vehicle in which the system is installed to get & store telematics in the central database (in the server). This may be used stand-alone, or in conjunction with driver's statistics from the mobile phone.

Commercial Off The Shelf (COTS) components or legacy vehicle components or accessories may be used wherever appropriate e.g. sensors serving the cell-ID functionality of FIG. 8; Main board components of FIG. 12 such as power 16 and speaker 52; and hardware for App server 60, Database server 70, Version control server 80 which may be separate servers or may be unified in a single server.

Typically, at least some components are installed in the vehicle and remain there even when the car is parked and the driver and his mobile are absent, e.g. some or all of System control unit 10, speaker 50, and some or all of the sensors operative for detecting the driver's mobile in conjunction with the Cellphone Identification Module 31 of when operating e.g. as per the method FIG. 8.

Typically, driver identification apparatus is installed in each vehicle and remains there irrespective of whether the driver and/or his cellphone is or is not in the vehicle. According to certain embodiments, an ID unique to the sustainable memory component (e.g. FLASH memory 24) installed in each vehicle is decoded by the system herein so as to uniquely identify each vehicle to the system e.g. to log events pertaining to an individual vehicle/driver and/or to record associations between vehicles and fleets.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as Smartphones may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A vehicle safety system operating on a driver's cellphone and comprising:
   selective blocking apparatus, controlled by a processor, for blocking specified functionalities of the cellphone only when the cellphone is in a vehicle in motion; and
   communication functionality operative to receive from a remote server and deliver updates which determine which specified functionalities the selective blocking apparatus is to block
   wherein the processor is configured to include cellphone identification functionality operative to identify presence of a cellphone in a driver's seat area by receiving and analyzing RF signals of the cellphone's modem and accordingly, to command the selective blocking apparatus to block specified functionalities of only the driver's cellphone without affecting functioning of other cellphones present in the vehicle
   the system also comprising plural sensors deployed in plural vehicle locations
   and wherein said cellphone identification functionality utilizes at least Channel Fingerprinting technology to distinguish the driver's cellphone from other cellphones present in a vehicle,
   and wherein said Channel Fingerprinting technology utilized by said cellphone identification functionality comprises Signal Level based technology
   wherein transmitted power values and frequency ranges of mobile phones are known to the system for each region based on a cellular standard employed by the phone and wherein propagation characteristics are predetermined in in-vehicle repeatability simulations.

2. The system according to claim 1, wherein said cellphone identification functionality utilizes at least Channel Fingerprinting technology to distinguish the driver's cellphone from other cellphones present in a vehicle, only if the vehicle is on.

3. The system according to claim 1, and wherein at least one of said sensors is deployed in line of sight of the phone when the phone is in a given location.

4. A computer program product, comprising a non-transitory tangible computer readable medium having computer readable program code embodied therein, said computer readable program code adapted to be executed to implement a vehicle safety method operating on a driver's cellphone and comprising:
   controlling a processor for selectively blocking specified functionalities of the cellphone only when the cellphone is in a vehicle in motion; and
   controlling communication functionality operative to receive from a remote server and deliver updates which determine which specified functionalities the selective blocking apparatus is to block,
   wherein the processor is configured to include cellphone identification functionality operative to identify presence of a cellphone in a driver's seat area by receiving and analyzing RF signals of the cellphone's modem and, accordingly, to block specified functionalities of only the driver's cellphone without affecting functioning of other cellphones present in the vehicle
   wherein plural sensors are deployed in plural vehicle locations
   and wherein said cellphone identification functionality utilizes at least Channel Fingerprinting technology to distinguish the driver's cellphone from other cellphones present in a vehicle,
   and wherein said Channel Fingerprinting technology utilized by said cellphone identification functionality comprises Signal Level based technology
   wherein transmitted power values and frequency ranges of mobile phones are known to the system for each region based on a cellular standard employed by the phone and wherein propagation characteristics are predetermined in in-vehicle repeatability simulations.

5. A vehicle safety method operating on a driver's cellphone and comprising:
   using a processor for selectively blocking specified functionalities of the cellphone only when the cellphone is in a vehicle in motion; and
   using communication functionality operative to receive from a remote server and deliver updates which determine which specified functionalities the selective blocking apparatus is to block,
   wherein the processor is configured to include cellphone identification functionality operative to identify presence of a cellphone in a driver's seat area by receiving and analyzing RF signals of the cellphone's modem and accordingly, to block specified functionalities of only the driver's cellphone without affecting functioning of other cellphones present in the vehicle, wherein said cellphone identification functionality utilizes at least Channel Fingerprinting technology to distinguish the driver's cellphone from other cellphones present in a vehicle, wherein said Channel Fingerprinting technology utilized by said cellphone identification functionality comprises Signal Level based technology, and wherein transmitted power values and frequency ranges of mobile phones are known to the system for each region based on a cellular standard employed by the phone and wherein propagation characteristics are predetermined in in-vehicle repeatability simulations.

6. The method according to claim 5, wherein said Channel Fingerprinting technology utilized by said cellphone identification functionality comprises Delay-spread based technology.

7. The method according to claim 5, wherein the Cellphone Identification functionality uses AOA in combination with channel fingerprinting.

8. The method according to claim 5, wherein the Cellphone Identification functionality uses TOA in combination with channel fingerprinting.

9. The method according to claim 5, wherein the Cellphone Identification functionality uses TODA in combination with channel fingerprinting.

10. The method according to claim 5, wherein said Channel Fingerprinting has an absolute power level.

11. The method according to claim 5, wherein said Channel Fingerprinting has a relative power level.

12. The method according to claim 5, wherein Wide-band sensors are provided.

13. The method according to claim 5, wherein Omni antenna may be provided.

14. The method according to claim 5, wherein partially directional antenna with higher gain may be provided, directed to the interior of the vehicle.

15. The method according to claim 5, wherein partially directional antenna with higher gain may be provided, directed to the driver vicinity.

16. The method according to claim 5, wherein said cellphone identification functionality utilizes at least Channel Fingerprinting technology to distinguish the driver's cellphone from other cellphones present in a vehicle whose engine is on.

17. The method according to claim 5, wherein said Channel Fingerprinting technology utilized by said cellphone identification functionality comprises Power Level based technology.

18. The method according to claim 5, wherein transmitted power values and frequency ranges of mobile phones are known for each region.

19. The method according to claim 5, wherein transmitted power values and frequency ranges of mobile phones are known for each region based on a cellular standard employed by the phone.

20. The method according to claim 5, wherein propagation characteristics are predetermined in in-vehicle repeatability simulations.

21. The method according to claim 5, wherein plural sensors are deployed in plural vehicle locations and wherein at least one of said sensors is deployed in line of sight of the phone when the phone is in a given location.

22. The method according to claim 5, wherein propagation characteristics of the interior of the vehicle are known.

* * * * *